United States Patent
Kose

(10) Patent No.: US 9,317,335 B2
(45) Date of Patent: Apr. 19, 2016

(54) REDUCING INTERNAL RETENTION TIME OF PROCESSING REQUESTS ON A WEB SYSTEM HAVING DIFFERENT TYPES OF DATA PROCESSING STRUCTURES

(71) Applicant: Hitachi Systems, Ltd., Shinagawa-ku, Tokyo (JP)

(72) Inventor: Junichi Kose, Yokohama (JP)

(73) Assignee: Hitachi Systems, Ltd., Tokyo (JP)

( * ) Notice: Subject to any disclaimer, the term of this patent is extended or adjusted under 35 U.S.C. 154(b) by 0 days.

(21) Appl. No.: 14/432,362

(22) PCT Filed: Apr. 14, 2014

(86) PCT No.: PCT/JP2014/060597
§ 371 (c)(1),
(2) Date: Mar. 30, 2015

(87) PCT Pub. No.: WO2015/159336
PCT Pub. Date: Oct. 22, 2015

(65) Prior Publication Data
US 2015/0339162 A1    Nov. 26, 2015

(51) Int. Cl.
  G06F 9/46      (2006.01)
  G06F 9/50      (2006.01)
  H04L 29/08     (2006.01)
  G06F 13/00     (2006.01)
  G06F 15/177    (2006.01)

(52) U.S. Cl.
CPC ... *G06F 9/505* (2013.01); *G06F 9/50* (2013.01); *G06F 13/00* (2013.01); *G06F 15/177* (2013.01); *H04L 67/02* (2013.01); *G06F 9/5083* (2013.01)

(58) Field of Classification Search
None
See application file for complete search history.

(56) References Cited

U.S. PATENT DOCUMENTS

| | | | |
|---|---|---|---|
| 6,128,642 A * | 10/2000 | Doraswamy | G06F 9/505 709/201 |
| 2005/0138626 A1 * | 6/2005 | Nagami | H04L 67/1008 718/105 |
| 2006/0212873 A1 | 9/2006 | Takahisa | |
| 2013/0024871 A1 | 1/2013 | Gao et al. | |

FOREIGN PATENT DOCUMENTS

| | | | |
|---|---|---|---|
| JP | 2006-221516 A | 8/2006 | |
| JP | 2006-259812 A | 9/2006 | |
| JP | 2013-222407 A | 10/2013 | |

OTHER PUBLICATIONS

International Search Report dated Aug. 5, 2014 with partial English translation (four (4) pages).
Japanese-language Written Opinion (PCT/ISA/237) dated Aug. 5, 2014, including English translation (six (6) pages).

* cited by examiner

*Primary Examiner* — Meng An
*Assistant Examiner* — James J Lee
(74) *Attorney, Agent, or Firm* — Crowell & Moring LLP

(57) ABSTRACT

An information processing apparatus calculates parameters corresponding to the data processing structure of a web system. An extraction unit 22 extracts, from operation data of a web system having capacity control parameters including a maximum queue length indicating the maximum size of a queue which temporarily stores request data and the maximum number of simultaneous executions indicating the maximum number of times the request data can be processed in parallel, an internal retention time required for the web system to process data in each number of internal retention requests which is the sum of the number of uses of the queue and the number of times the request data is processed in parallel. A coefficient calculation unit 23 applies an approximate equation corresponding to the data processing structure of the web system to the internal retention time in the number of internal retention requests extracted by the extraction unit 22 to calculate coefficients of the approximate equation. A parameter calculation unit 24 calculates new capacity control parameters from the approximate equation calculated by the coefficient calculation unit 23.

11 Claims, 23 Drawing Sheets

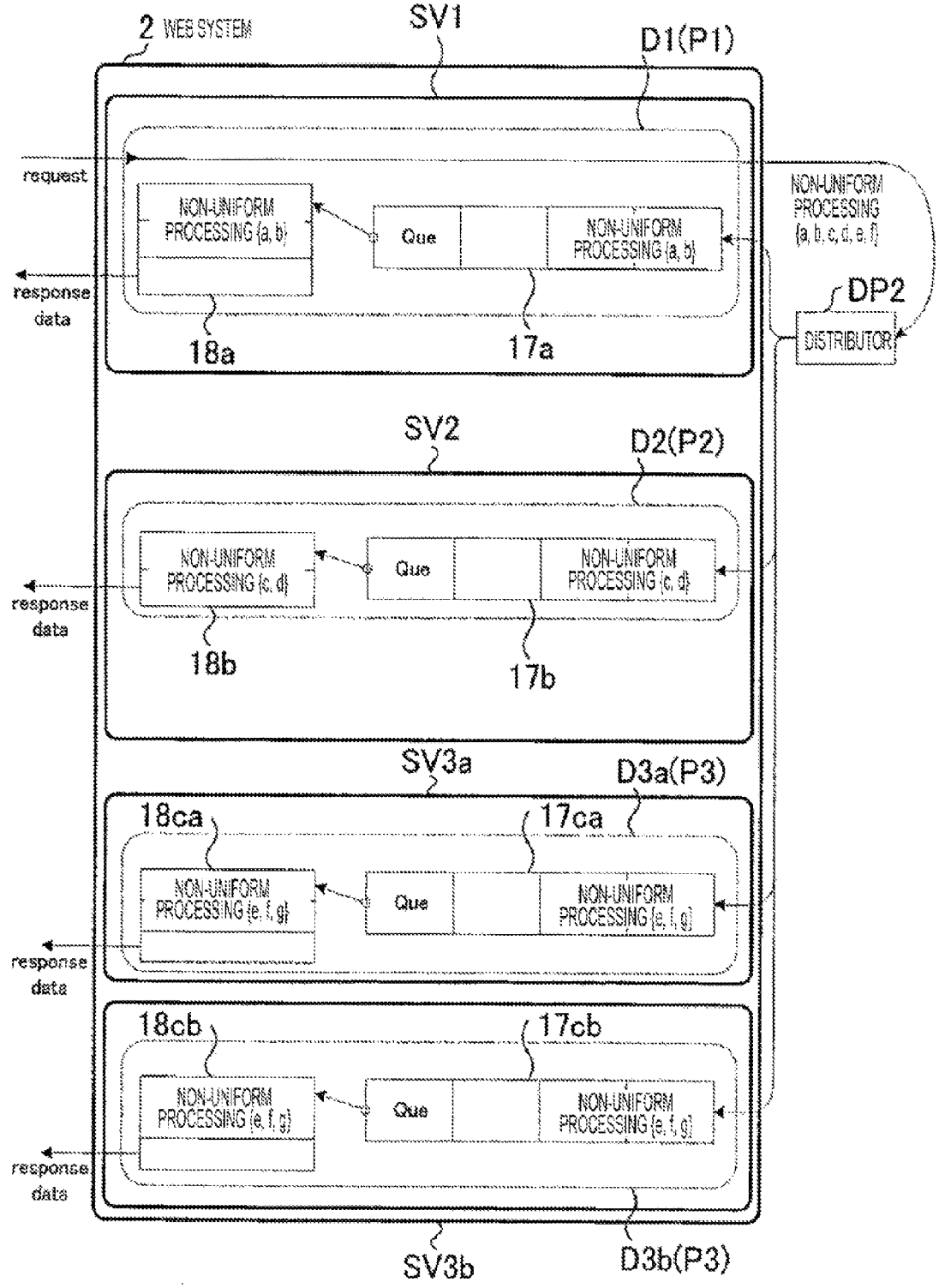

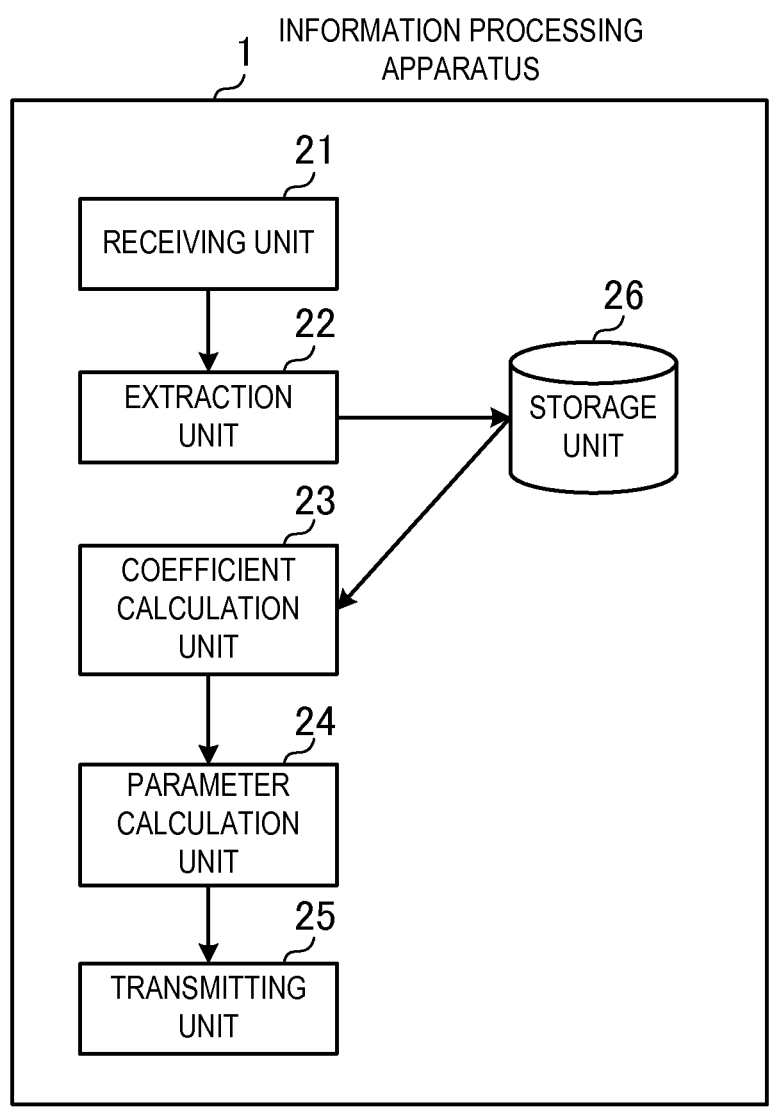

FIG.12

| | |
|---|---|
| 4698 2013/06/16 16:43:25.631  HEJB  0000277C 000013C4  KDJE21019-I  Request  Receive:  method=GET  protocol=HTTP/1.1  content-length=0  uri=/ua/time.TimeKeeper query_string=p=281&aps=135406<br>4699 2013/06/16 16:43:25.631  HEJB  0000277C 000013C4  KDJE21022-I  Send  Message:  socket=4872 local_addr=172.30.4.10  local_port=64021  remote_addr=172.30.4.10 remote_port=8007 size=520<br>4700 2013/06/16 16:43:25.631  HEJB  0000277C 000013C4  KDJE21024-I  Received  Message:  sd=4872 local_addr=172.30.4.10  local_port=64021  remote_addr=172.30.4.10 remote_port=8007 size=10 type=4 status=200<br>4701 2013/06/16 16:43:25.631  HEJB  0000277C 000013C4  KDJE21025-I  Received  Message:  sd=4872 local_addr=172.30.4.10  local_port=64021  remote_addr=172.30.4.10 remote_port=8007 size=12 type=3<br>4702 2013/06/16 16:43:25.631  HEJB  0000277C 000013C4 KDJE21026-I Received Message: sd=4872 local_addr=172.30.4.10 local_port=64021 remote_addr=172.30.4.10 remote_port=8007 size=2 type=5 | RECEPTION TIME OR RESPONSE TIME OF PROCESSING REQUEST WHICH IS RECEIVED WITH PROCESS ID "0000277C" AND THREAD ID "000013C4" IS RECORDED |
| 4703 2013/06/16 16:43:26.692  HEJB  0000277C 0000200C  KDJE21019-I  Request  Receive:  method=GET protocol=HTTP/1.1  content-length=0  uri=/ua/time.TimeKeeper query_string=p=290&aps=1282932<br>4704 2013/06/16 16:43:26.692  HEJB  0000277C 0000200C  KDJE21022-I  Send  Message:  socket=4872 local_addr=172.30.4.10  local_port=64021  remote_addr=172.30.4.10 remote_port=8007 size=519<br>4705 2013/06/16 16:43:26.692  HEJB  0000277C 0000200C  KDJE21024-I  Received  Message:  sd=4872 local_addr=172.30.4.10  local_port=64021  remote_addr=172.30.4.10 remote_port=8007 size=10 type=4 status=200<br>4706 2013/06/16 16:43:26.692  HEJB  0000277C 0000200C  KDJE21025-I  Received  Message:  sd=4872 local_addr=172.30.4.10  local_port=64021  remote_addr=172.30.4.10 remote_port=8007 size=12 type=3<br>4707 2013/06/16 16:43:26.692  HEJB  0000277C 0000200C KDJE21026-I Received Message: sd=4872 local_addr=172.30.4.10 local_port=64021 remote_addr=172.30.4.10 remote_port=8007 size=2 type=5 | RECEPTION TIME OR RESPONSE TIME OF PROCESSING REQUEST WHICH IS RECEIVED WITH PROCESS ID "0000277C" AND THREAD ID "0000200C" IS RECORDED |

| | | | | CONTENT OF HTTP REQUEST | | | PROCESS IDENTIFICATION INFORMATION | | | | | |
|---|---|---|---|---|---|---|---|---|---|---|---|---|
| RECEPTION TIME | END TIME | INTERNAL RETENTION TIME | Http. Method | http_url | http_query_string | Http. UriGroup Name | Http. queryID | http_ status | remote_ addr | remote_ port | NUMBER OF INTERNAL RETENTION REQUESTS FOR EACH PROCESS IDENTIFIER | NUMBER OF INTERNAL RETENTION REQUESTS FOR EACH PROCESS |
| 32a | 32b | 32c | 32d | 32e | 32f | 32g | 32h | 32i | 32j | 32k | 32l | 32m |
| 2013/ 06/ 16 23:2 7:49. 957 | 2013/ 06/ 16 23:2 7:49. 988 | 0.03 1 | GET | /context0 01/ svcName0 2;jsessioni d=003BF8 CA6607A 74BCE3B 9E05813B 07800300 0003 | pgCode=KYU010 &stat=2&setItem =kyukaCode2&u serCode=uuuu&k inmuDate=2013- 06-03 | /context001/ svcName02 | pgCode=KYU 010&stat=2& &setItem=k yukaCode2 | 200 | WebApSv 01 | 8009 | 2 | 2 |
| 2013/ 06/ 16 23:3 5:20. 782 | 2013/ 06/ 16 23:3 5:20. 798 | 0.01 6 | POST | /context0 01/ svcName0 3 | p=18&ps=30475 67 | /context001/ svcName03 | | 200 | WebApSv 01 | 8009 | 2 | 1 |
| ... | ... | ... | ... | ... | ... | ... | ... | ... | ... | ... | ... | ... |

FIG.14

| EXTRACTION DESIGNATION PARAMETERS | DESCRIPTION OF PARAMETERS |
|---|---|
| edit_log.ServerName(WebAPsv001).alters.name =WebAPsv;<br><br>edit_log.ServerName(127.0.0.1).alters.name=WebAPsv ; | REPLACE NAMES OF WEB SERVERS WITH DIFFERENT IP ADDRESSES WITH ONE NAME |
| edit_log.URLGroup(1).Pattern=^(/[a-zA-Z0-9@#\._-]+/(?:[a-zA-Z0-9@#\._-]+/)*)(\w+)(?:\.(js\|gif\|png\|pdf\|ico\|jpg\|css\|exe\|htm\|html\|properties)$) ;<br><br>edit_log.URLGroup(1).IDString=%StaticContents% ; | REPLACE URL GROUP FOR STATIC CONTENTS WITH ONE TYPE OF CHARACTER STRING ("%StaticContents%") SUCH THAT URLS ARE REGARDED AS SAME PROCESS IDENTIFIER |
| edit_log.URLId(5).Pattern=^/([a-zA-Z0-9@#\._/-]+)(?:\x3b)?(?:jsessionid=[0-9a-zA-Z]+)?(?:[&])?(pgCode=[a-zA-Z0-9]+)?;<br><br>edit_log.URLId(5).IDString=/$1,$2 ; | REMOVE jsessionid INCLUDED IN URL CHARACTER STRING SUCH THAT ONLY PORTION WHICH AFFECTS INTERNAL RETENTION TIME IS REGARDED AS PROCESS IDENTIFIER |
| edit_log.QueryString(3).Pattern=.*?(?:&(?:(pcCode=[^&]+)\|(stat=[^&]+)\|[^&]*))*;<br><br>edit_log.QueryString(3).IDString=$1&$2; | ONLY PORTION WHICH AFFECTS INTERNAL RETENTION TIME IN query CHARACTER STRING INCLUDED IN HTTP REQUEST IS REGARDED AS PROCESS IDENTIFIER |

FIG.16

| | Identification Information | | Preliminary Approximate Equation | Average Value of Internal Retention Times for Each Number of Internal Retention Requests | | | | | | | | | | | |
|---|---|---|---|---|---|---|---|---|---|---|---|---|---|---|---|
| | | | | 1 | 2 | 3 | 4 | 5 | 6 | 7 | 8 | 9 | 10 | 11 | 12 |
| A21 | Unit of Process | WebAPSv01:8009 | (0.329)* exp(x-1)/4.83 | 0.090 | 0.347 | 0.426 | 0.579 | 1.342 | 1.389 | 1.239 | 2.712 | 4.162 | 12.265 | 1.502 | 4.433 |
| A22 | | WebAPSv02:8008 | (0.781)* exp(x-1)/4.19 | 0.097 | 1.153 | 2.245 | 3.138 | 3.824 | 4.428 | 5.530 | 5.041 | 5.336 | 5.193 | 8.888 | 7.175 |
| A23 | Unit of Process Identifier | /context001/ svcName99.pg Code=xxP11 WebA PSv01 :8009 | (3.118)* exp(x-1)/1.16 | 1.595 | 13.674 | 27.518 | 21.812 | 105.37 | | | | | | | |
| A24 | | /context001/ svcName99.pg Code=xxE11 WebA PSv01 :8009 | (8.521)* exp(x-1)/1.89 | 2.807 | 18.315 | 25.430 | 38.372 | 30.854 | 27.766 | | | | | | |
| A25 | | /context001/ svcName99.pg Code=xxP12 WebA PSv01 :8009 | (11.143)* exp(x-1)/2.82 | 0.530 | 9.036 | 31.295 | 55.878 | 51.490 | 46.959 | 88.333 | | | | | |
| A26 | | /context001/ svcName99.pg Code=xWE15 WebA PSv01 :8009 | (0.690)* exp(x-1)/1.02 | 0.100 | 11.703 | 14.552 | 12.778 | 12.704 | | | | | | | |
| A27 | | /context001/ svcName99.pg Code=xWE11 WebA PSv01 :8009 | (8.882)* exp(x-1)/8.34 | 2.890 | 10.482 | 11.590 | 12.498 | 15.202 | 16.194 | 14.506 | 12.346 | | | | 20.350 |
| A28 | | /context001/ svcName99.pg Code=xRQ12 WebA PSv01 :8009 | (4.593)* exp(x-1)/6.32 | 3.842 | 6.091 | 7.266 | 7.128 | 8.024 | | | | | | | |
| A29 | | /context001/ svcName99.pg Code=xLE025 WebA PSv02 :8008 | (5.291)* exp(x-1)/14.38 | 3.218 | 6.171 | 6.794 | 7.406 | 7.968 | 8.207 | 8.932 | 8.147 | 8.324 | | | 9.077 |
| A30 | | /context001/ svcName99.pg Code=xWQ11 &stat=2&& WebA PSv02 :8008 | (5.128)* exp(x-1)/20.34 | 4.742 | 5.499 | 5.740 | 6.253 | 6.786 | 6.411 | 6.484 | 7.188 | | | 81.362 | |

REDUCING INTERNAL RETENTION TIME OF PROCESSING REQUESTS ON A WEB SYSTEM HAVING DIFFERENT TYPES OF DATA PROCESSING STRUCTURES

TECHNICAL FIELD

The present invention relates to an information processing apparatus, a capacity control parameter calculation method, and a program.

BACKGROUND ART

There is a web system which performs processing in response to a processing request from a terminal apparatus through a network such as the Internet. In the web system, for example, an important factor is how quickly a response to the processing request from the terminal apparatus returns.

In recent years, a communication server set value determination apparatus has been proposed which can determine the set value of the maximum number of parallel processing operations of a server apparatus and the set value of the maximum number of queues with a simple structure such that the maximum processing capability of the server apparatus can be exhibited, the response time can be reduced, and the allowable response time can be ensured (for example, see Patent Literature 1).

CITATION LIST

Patent Literature

Patent Literature 1: JP 2006-221516 A

SUMMARY OF INVENTION

Technical Problem

However, the communication server set value determination apparatus disclosed in Patent Literature 1 does not determine the maximum number of parallel processing operations and the maximum number of queues (parameters) corresponding to the data processing structure of the web system. Therefore, in some cases, the determined parameters are not appropriate according to the data processing structure of the web system.

The communication server set value determination apparatus disclosed in Patent Literature 1 has a function of supporting an automatic load input test on condition that the load input test is repeatedly performed. However, it is difficult to prepare, for example, data only for the load input test in order to equalize the type of processing to which a load is applied or job mix with that in an operation system. When it is difficult to equalize the type of processing to which a load is applied or job mix with that in the operation system, it is not guaranteed that the set value of the communication server in the load input test is a server set value most suitable for job mix in the operation system in the communication server set value determination apparatus disclosed in Patent Literature 1.

An object of the present invention is to provide a technique for calculating parameters corresponding to the data processing structure of a web system. Another object of the present invention is to provide a technique for calculating parameters most suitable for job mix in an operation system, without depending on the repetition of a load input test.

Solution to Problem

The present application includes a plurality of solutions to at least a part of the problem described above, and examples of the solutions are as follows. To solve the above problem, an information processing apparatus according to the present invention includes: an extraction unit that extracts, from operation data of a web system having capacity control parameters including a maximum queue length indicating a maximum size of a queue which temporarily stores request data and the maximum number of simultaneous executions indicating the maximum number of times the request data can be processed in parallel, an internal retention time required for the web system to process data in each number of internal retention requests which is the sum of the number of uses of the queue and the number of times the request data is processed in parallel; a coefficient calculation unit that applies an approximate equation corresponding to a data processing structure of the web system to the internal retention time in the number of internal retention requests extracted by the extraction unit to calculate coefficients of the approximate equation; and a parameter calculation unit that calculates new capacity control parameters from the approximate equation having the coefficients calculated by the coefficient calculation unit.

In the information processing apparatus, the data processing structure of the web system may be classified into at least: a first data processing structure including one queue to which the request data for the content of uniform processing is input and one data processing unit which can process the maximum number of simultaneous executions in parallel and to which the request data for the content of uniform processing is input; a second data processing structure in which a plurality of sets, each having one queue to which the request data for the content of uniform processing is input and one data processing unit which can process the maximum number of simultaneous executions in parallel and to which the request data for the content of uniform processing is input, are provided so as to correspond to processes; a third data processing structure in which a plurality of sets, each having one queue to which the request data for the content of non-uniform processing is input and a plurality of data processing units which can process the maximum number of simultaneous executions in parallel and to which the request data for the content of uniform processing is input, are provided so as to correspond to processes; and a fourth data processing structure including one queue to which the request data for the content of non-uniform processing is input and one data processing unit which can process the maximum number of simultaneous executions in parallel and to which the request data for the content of non-uniform processing is input.

Further, in the information processing apparatus, the coefficient calculation unit may calculate preliminary coefficients using an approximate equation when the number of internal retention requests is less than the maximum number of simultaneous executions and select the approximate equation corresponding to the data processing structure of the web system on the basis of the calculated preliminary coefficients.

Further, in the information processing apparatus, the extraction unit may divide the internal retention time into the internal retention time for each process and the internal retention time for each process identifier which is processed by the process and extract the internal retention time, the coefficient calculation unit may substitute the internal retention time for each process extracted by the extraction unit into the approximate equation and calculate the preliminary coefficients for each process, and the coefficient calculation unit may substitute the internal retention time for each process identifier for identifying processing performed at a uniform speed, which is extracted by the extraction unit, into the approximate equation and calculate the preliminary coefficients for each process identifier.

Further, in the information processing apparatus, the coefficient calculation unit may calculate the coefficients on the basis of the approximate equation corresponding to the first data processing structure when the preliminary coefficients for each process and the preliminary coefficients for each process identifier have the same value.

Further, in the information processing apparatus, the coefficient calculation unit may calculate the coefficients on the basis of the approximate equation corresponding to the second data processing structure when the preliminary coefficients for each process and the preliminary coefficients for each process identifier do not have the same value and the preliminary coefficients for each process identifier have the same value in the same process.

Further, in the information processing apparatus, the coefficient calculation unit may calculate the coefficients on the basis of the approximate equation corresponding to the third data processing structure when the preliminary coefficients for each process and the preliminary coefficients for each process identifier do not have the same value, the preliminary coefficients for each process identifier do not have the same value in the same process, and the capacity control parameters are given for each process and each process identifier.

Further, in the information processing apparatus, the coefficient calculation unit may calculate the coefficients on the basis of the approximate equation corresponding to the fourth data processing structure when the preliminary coefficients for each process and the preliminary coefficients for each process identifier do not have the same value, the preliminary coefficients for each process identifier do not have the same value in the same process, and the capacity control parameters are given only for each process.

Further, in the information processing apparatus, the parameter calculation unit may calculate the maximum number of simultaneous executions, at which the internal retention time at the assumed amount of load of the web system is minimized, from the approximate equation whose coefficients have been calculated.

Further, in the information processing apparatus, the parameter calculation unit may calculate the upper limit of the number of internal retention requests which does not exceed the internal retention time allowed in the web system from the approximate equation whose coefficients have been calculated, and the parameter calculation unit may calculate the maximum queue length from the maximum number of simultaneous executions and the upper limit of the number of internal retention requests.

Further, a method for calculating capacity control parameters of an information processing apparatus according to the present invention includes: an extraction step of extracting, from operation data of a web system having the capacity control parameters including a maximum queue length indicating a maximum size of a queue which temporarily stores request data and the maximum number of simultaneous executions indicating the maximum number of times the request data can be processed in parallel, an internal retention time required for the web system to process data in each number of internal retention requests which is the sum of the number of uses of the queue and the number of times the request data is processed in parallel; a coefficient calculation step of applying an approximate equation corresponding to a data processing structure of the web system to the internal retention time in the number of internal retention requests extracted in the extraction step to calculate coefficients of the approximate equation; and a parameter calculation step of calculating new capacity control parameters from the approximate equation having the coefficients calculated in the coefficient calculation step.

Further, a program of an information processing apparatus according to the present invention causes the information processing apparatus to function as: an extraction unit that extracts, from operation data of a web system having capacity control parameters including a maximum queue length indicating a maximum size of a queue which temporarily stores request data and the maximum number of simultaneous executions indicating the maximum number of times the request data can be processed in parallel, an internal retention time required for the web system to process data in each number of internal retention requests which is the sum of the number of uses of the queue and the number of times the request data is processed in parallel; a coefficient calculation unit that applies an approximate equation corresponding to a data processing structure of the web system to the internal retention time in the number of internal retention requests extracted by the extraction unit to calculate coefficients of the approximate equation; and a parameter calculation unit that calculates new capacity control parameters from the approximate equation having the coefficients calculated by the coefficient calculation unit.

Advantageous Effects of Invention

According to the present invention, it is possible to calculate parameters corresponding to the data processing structure of a web system.

Other objects, features and advantages will become apparent from the following detailed description of embodiments.

BRIEF DESCRIPTION OF DRAWINGS

FIG. 10 is a diagram illustrating a fourth example of the data processing structure of the web system 2.

FIG. 11 is a diagram illustrating an example of the functional block of an information processing apparatus 1.

FIG. 12 is a diagram illustrating an example of operation data of the web system 2.

FIG. 13 is a diagram illustrating the extraction of temporary information.

FIG. 14 is a diagram illustrating a predetermined rule.

FIG. 16 is a diagram illustrating an example of the data structure of information for regression analysis.

DESCRIPTION OF EMBODIMENTS

Figure 1:
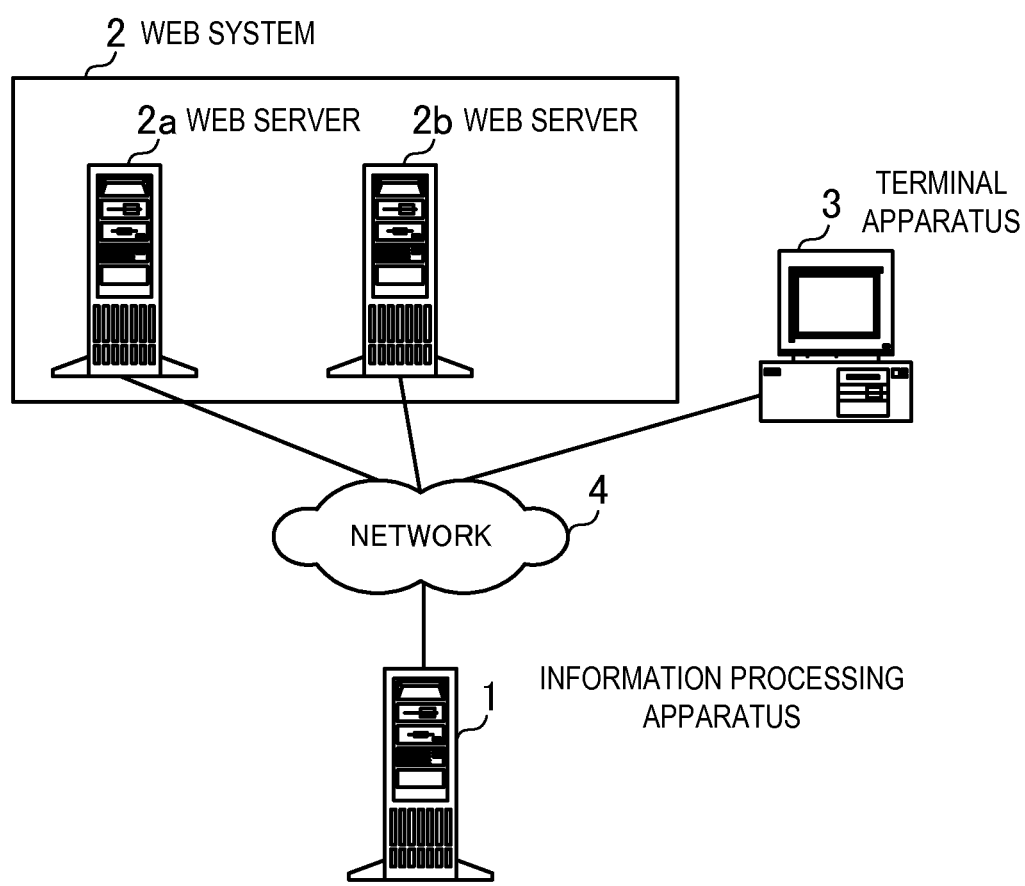
FIG. 1 is a diagram illustrating an example of the structure of a network system to which an information processing apparatus according to an embodiment of the present invention is applied.

FIG. 1 is a diagram illustrating an example of the structure of a network system to which an information processing apparatus according to an embodiment of the present invention is applied. As illustrated in FIG. 1, the network system includes an information processing apparatus 1, a web system 2, a terminal apparatus 3, and a network 4. The network 4 is, for example, the Internet.

The web system 2 includes web servers 2a and 2b. In FIG. 1, the web system 2 includes two web servers 2a and 2b. However, the web system 2 may include one web server or three or more web servers.

The terminal apparatus 3 is connected to the web system 2 (web servers 2a and 2b) through the network 4. The terminal apparatus 3 transmits request data to the web system 2. The request data includes, for example, a uniform resource locator (URL) or a request parameter. The web system 2 (web servers 2a and 2b) performs a predetermined process in response to the request data from the terminal apparatus 3 and transmits the processing result to the terminal apparatus 3. In FIG. 1, one terminal apparatus 3 is illustrated. However, two or more terminal apparatuses 3 may be provided.

The web system 2 includes capacity control parameters for each process, which will be described in detail below. The capacity control parameters include a maximum queue length indicating the maximum size of a queue which temporarily stores the request data from the terminal apparatus 3 (the maximum number of request data items which can be stored) and the maximum number of simultaneous executions which indicates the maximum number of request data items which can be processed in parallel by the process in the web system 2. The web system 2 can change the maximum queue length and the maximum number of simultaneous executions to change the processing time of the request data.

The information processing apparatus 1 is connected to the web system 2 (web servers 2a and 2b) through the network 4. The information processing apparatus 1 receives operation data from the web system 2 and calculates a new capacity control parameter on the basis of the received operation data, in response to, for example, instructions from the administrator who manages the web system 2. Then, the information processing apparatus 1 transmits the calculated new capacity control parameter to the web system 2.

The information processing apparatus 1 calculates an appropriate capacity control parameter corresponding to the operation data from the web system 2. Therefore, the web system 2 can rapidly return a response to the request data from the terminal apparatus 3.

Figure 2:
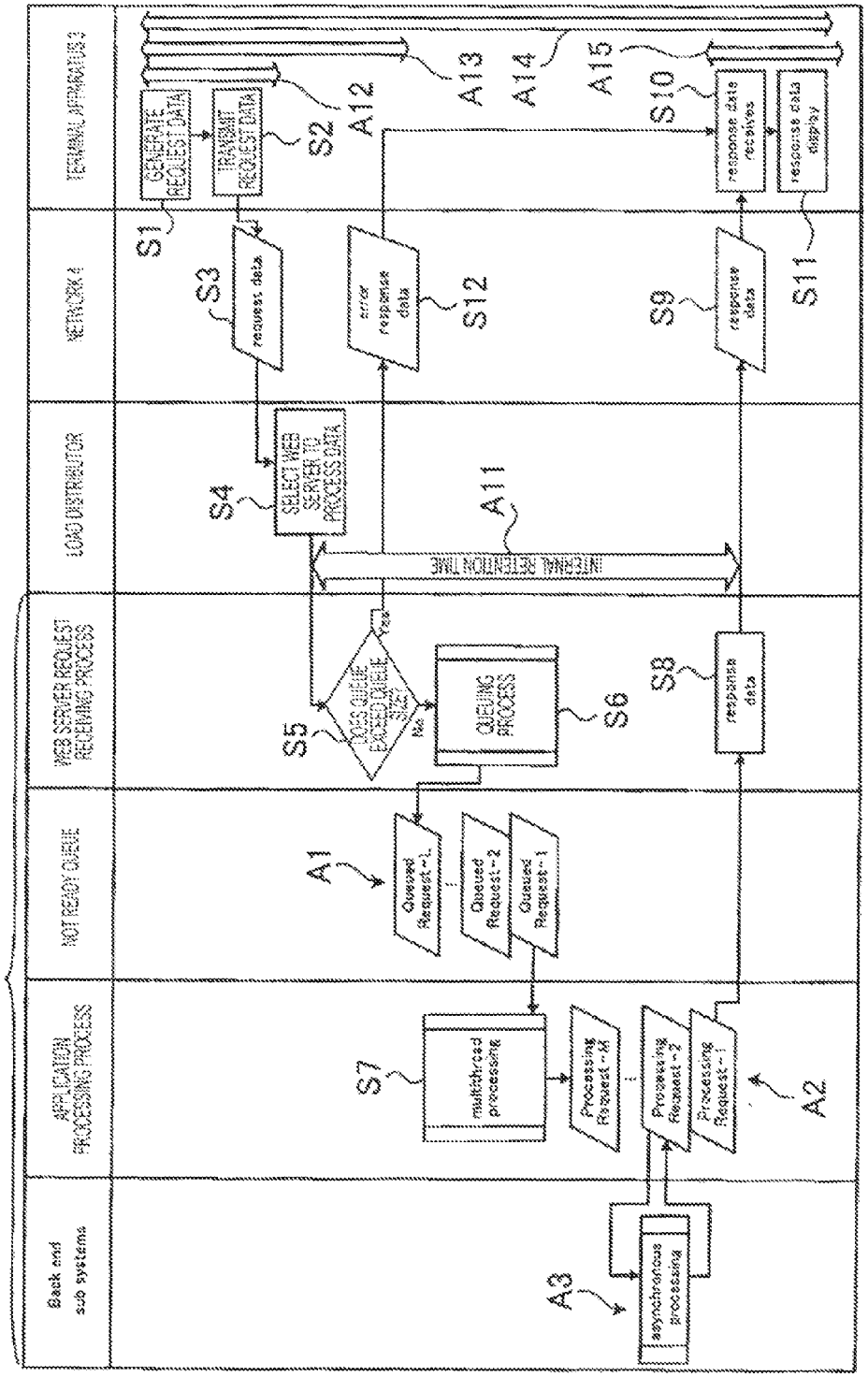
FIG. 2 is a sequence diagram illustrating the outline of the operation of the system illustrated in FIG. 1.

FIG. 2 is a sequence diagram illustrating the outline of the operation of the system illustrated in FIG. 1. The process in the sequence diagram illustrated in FIG. 2 is performed, for example, when the terminal apparatus 3 receives a predetermined operation from the user. As illustrated in FIG. 2, the process of the web system 2 is divided into a web server request receiving process, a process waiting queue, an application processing process, and a back-end subsystem.

First, the terminal apparatus 3 generates, for example, request data to be processed by the web system 2 (step S1).

Then, the terminal apparatus 3 transmits the generated request data to a load distributor (not illustrated in FIG. 1) through the network 4 (steps S2 and S3).

Then, the load distributor receives the request data from the terminal apparatus 3 and selects the web server 2a or 2b which will process the received request data (step S4). For example, the load distributor selects the web server 2a or 2b which will process the received request data, on the basis of process identification information, such as the URL included in the request data.

The web system 2 (web servers 2a and 2b) determines whether a queue which temporarily stores the request data (in the following description, the request data is referred to as a processing request in some cases) received from the terminal apparatus 3 is greater than the maximum queue length (step S5). When the queue which temporarily stores the processing request is greater than the maximum queue length, the web system 2 advances the process to step S12. When the queue which temporarily stores the processing request is not greater than the maximum queue length, the web system 2 advances the process to step S6.

In FIG. 2, an arrow A1 indicates the queue in which the processing request is currently temporarily stored. The queue indicated by the arrow A1 temporarily stores L processing requests.

When it is determined in step S5 that the queue which temporarily stores the processing request is not greater than the maximum queue length ("No" in step S5), the web system 2 stores the received processing request in an empty queue (step S6).

Then, the web system 2 processes the processing requests stored in the queue in parallel (step S7). The maximum number of simultaneous executions of the web system 2 illustrated in FIG. 2 is "M", as represented by an arrow A2. As represented by an arrow A3, the web system 2 transfers a portion of an application process to the "back-end subsystem" and asynchronously processes the application process.

Then, the web system 2 transmits the processing result (response data) of the processing request to the terminal apparatus 3 through the network 4 (steps S8 and S9).

Then, the terminal apparatus 3 receives the response data from the web system 2 and displays the received response data on, for example, a display (steps S10 and S11).

When it is determined in step S5 that the queue which temporarily stores the processing request is greater than the maximumqueue length ("Yes" in step S5), the web system 2 transmits error response data indicating a processing error to the terminal apparatus 3 through the network 4 (step S12).

The terminal apparatus 3 displays the error response data received from the web system 2 on, for example, the display (steps S10 and S11).

As represented by an arrow A11, the time required for the process from step S5 to step S8 is referred to as an "internal retention time". That is, the time from the reception of the processing request from the terminal apparatus 3 by the web system 2 to the transmission of the response data to the terminal apparatus 3 is referred to as the "internal retention time".

As represented by an arrow A12, the time required for the process from step S1 to step S2 is referred to as a "client-side time". That is, the time from the generation of the processing request by the terminal apparatus 3 to the transmission of the processing request is referred to as the "client-side time".

As represented by an arrow A13, the time required for the process from Step s1 to step S5 and step S12 is referred to as an "error response time". That is, the time from the generation of the processing request by the terminal apparatus 3 to the reception of the error response data indicating the processing error is referred to as the "error response time".

As represented by an arrow A14, the time required for the process from step S1 to step S11 is referred to as a "normal response time". That is, the time from the generation of the processing request by the terminal apparatus 3 to the reception of normal response data is referred to as the "normal response time".

As represented by an arrow A15, the time required for the process from step S10 to step S11 is referred to as a "client-side time". That is, the time from the reception of the response data from the web system 2 by the terminal apparatus 3 to the display of the response data is referred as the "client-side time".

The "normal response time" represented by an arrow A14 is the sum of the "client-side time" represented by the arrow A12, the "internal retention time" represented by the arrow A11, and the "client-side time" represented by the arrow A15.

Here, the internal retention time includes only the processing time of the process which is controlled by the capacity control parameter. Since the "response time", such as the "normal response time" or the "error response time", includes the processing time of the process which is not controlled by the capacity control parameter, it is clear that the method which calculates the capacity control parameter from the "response time" is inaccurate.

In some cases, the operation data recorded by the web system 2 includes an "internal retention time required to generate normal response data" which varies depending on the capacity control parameter and an "internal retention time required to generate error response data" in "S3 and S4 to S12" which does not vary depending on the capacity control parameter. It is possible to determine the error response data on the basis of, for example, an HTTP status code which is recorded together with the internal retention time in the operation data.

[Description of Relationship among Internal Retention Time, Number of Uses of Queue, and Maximum Number of Simultaneous Executions]

Next, an approximate equation of the "internal retention time" of the web system 2 to "the number of internal retention requests which is the sum of the number of uses of the queue and the number of parallel processing operations for the request data" and "the maximum number of simultaneous executions" will be described.

The web system 2 implements a data processing structure including a queue A1 (for example, the arrow A1 illustrated in FIG. 2) which temporarily stores the processing requests and a data processing unit A2 (for example, the arrow A2 illustrated in FIG. 2) which processes the processing requests in parallel, using the web servers 2a and 2b.

The data processing unit A2 which processes the processing requests in parallel processes in parallel the request data that is equal to or less than "the maximum number of simultaneous executions (max Threads)", "M", which is referred to as the "number of simultaneous executions".

The "upper limit of the number of simultaneous executions" which can be set for each process or each process identifier is referred to as "the maximum number of simultaneous executions (max Threads)".

When a request that is greater than the set value "M" of the maximum number of simultaneous executions is received, the number of processing requests temporarily stored in the queue A1 is referred to as the "number of uses of the queue (queue size)".

A request receiving unit S5 includes a maximum queue length" as the upper limit of the "number of uses of the queue (queue size)".

The sum of the "number of simultaneous executions" and the "number of uses of the queue" is referred to as "the number of internal retention requests" "L".

An approximate equation of the "internal retention time" of the web system 2 can be represented by the number of internal retention requests "L", the maximum number of simultaneous executions "M" of the data processing unit, and coefficients "p", "q", and "r", as illustrated in the following Expression (1) and Expression (2).

[Mathematical Formula 1]

$$y = p \times e^{\left(\frac{L-1}{q}\right)} \text{ {if } } L \leq M \tag{1}$$

[Mathematical Formula 2]

$$y = p \times e^{\left(\frac{M-1}{q}\right)} + \left(r \times p \times e^{\left(\frac{M-1}{q}\right)}\right) \times \frac{L-M}{M} \text{ {if } } L \geq M \tag{2}$$

The coefficients "p", "q", and "r" illustrated in Expression (1) and Expression (2) can be calculated from the operation data of the web system 2 by regression analysis. When the coefficients "p", "q", and "r" calculated by the regression analysis are substituted into Expression (1) and Expression (2), it is possible to calculate an expression indicating internal retention time "y", which has the number of internal retention requests "L" and the maximum number of simultaneous executions "M" as variables.

It is possible to calculate, from the calculated expression, the improved value of the maximum number of simultaneous executions "M" of a new capacity control parameter of the web system 2 for minimizing the internal retention time "y" or the queue length of a new capacity control parameter for preventing the internal retention time "y" from exceeding the allowable internal retention time.

For example, the coefficients "p" and "q" in Expression (1) can be calculated by regression analysis from a pair of the logarithmic value "Log $(y_k)$" of the internal retention time and the number of internal retention requests "$L_k$" that is less than the set value "M" of the maximum number of simultaneous executions at the time when the operating data is acquired, during the average internal retention time for each of the numbers of internal retention requests which are extracted from the operation data of the web system 2.

When coefficients of a linear approximate equation of the internal retention time "$y_k$" and the number of internal retention requests "$L_k$" that is greater than the set value "M" of the maximum number of simultaneous executions at the time when the operating data is acquired, during the average internal retention time for each of the numbers of internal retention requests extracted from the operation data of the web system 2, and the calculated coefficients "p" and "q" are substituted into Expression (2), a linear equation related to r" is obtained and it is possible to calculate the value of "r".

The web system 2 includes "the maximum number of simultaneous executions (max Threads) M" and the "maximum queue length" as settable capacity control parameters for each process for the processing request or each process identifier. In addition, the process identifier is an identifier for identifying the type of content of data processing which is started by the request data, which will be described below.

When "the number of internal retention requests" is large, the web system 2 has a large load. Any other "amount of load" is also a metric having a positive correlation with "internal retention time", such as the "number of internal retention request". On the other hand, throughput and traffic (request number/sec) is not "amount of load", because there is a case in which it has a negative correlation with the "internal retention time" (see FIGS. 15(A) to 15(C)).

Next, the calculation of Expression (1) and Expression (2) will be described.

Figure 3:
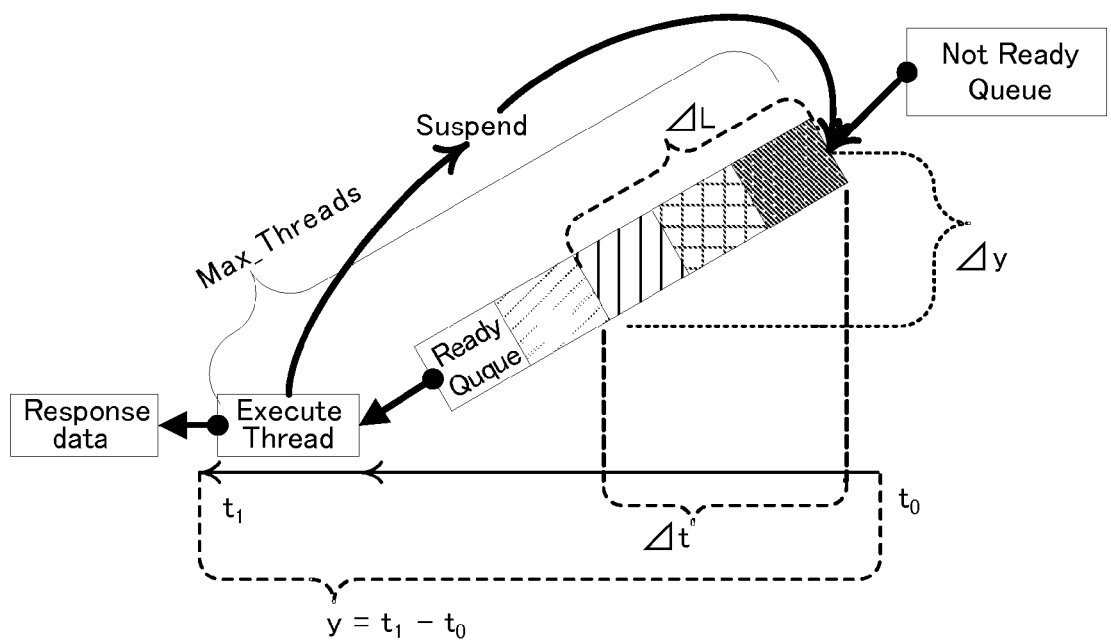
FIG. 3 is a diagram illustrating an approximate equation of an internal retention time.

FIG. 3 is a diagram illustrating the approximate equation of the internal retention time. In the following description, the approximate equation of the internal retention time is calculated from a multi-stage queuing model which is a combination of a network queuing model and an M/M/C queuing model.

First, an approximate equation when the number of internal retention requests "L" is less than the maximum number of simultaneous executions "M" is derived. When L<M is satisfied, the network queuing model illustrated in FIG. 3 can be applied as a model for a scheduler which performs pre-emptive multi-thread control.

Here, in FIG. 3, "Ready Queue" indicates a ready queue of an instantaneously executable processing thread. In addition, "Execute Thread" indicates a thread which is being executed. When the execution of a process is stopped (suspended) by time division multiplexing control or resource waits, the process is queued into the "Ready Queue" again by the pre-emptive multi-thread control.

"Max Threads" indicates the maximum number of simultaneous executions (the maximum number of threads which is the sum of the "Ready Queue" and the "Execute Threads").

In addition, "$t_0$" indicates the arrival time when the thread first enters the "Ready Queue" of the processing request and "$t_1$" indicates the time when data processing corresponding to the processing request is completed and the processing request is separated from the system.

"$y=t_1-t_0$" indicates the internal retention time (the separation time from a queuing network by the pre-emptive multi-thread control).

"$\Delta t$" indicates a infinitesimal time. "$\Delta L$" indicates the number of threads which are queued into the "Ready Queue" during the infinitesimal time "$\Delta t$". That is, "$\Delta L$" indicates a variation in the number of internal retention requests "L" at the infinitesimal time "$\Delta t$".

"$\Delta y$" indicates a variation in the separation time "y" due to a change in the length of the "Ready Queue" at the infinitesimal time "$\Delta t$".

As illustrated in FIG. 3, an amount of increase "$\Delta L$" in the number of internal retention requests at the infinitesimal time "$\Delta t$" is proportional to the infinitesimal time "$\Delta t$". In addition, the internal retention time "$\Delta y$" to be increased at the infinitesimal time "$\Delta t$" is proportional to the infinitesimal time "$\Delta t$". In this way, the following two expressions are derived.

[Mathematical Formula 3]

$$\Delta L \partial \Delta t \quad (3)$$

[Mathematical Formula 4]

$$\Delta y \partial \Delta t \quad (4)$$

When $\Delta t$ is removed from the above-mentioned Expression (3) and Expression (4), the following Expression (5) is obtained.

[Mathematical Formula 5]

$$\Delta y \partial \Delta L \quad (5)$$

In the cycle in which the threads are repeatedly switched by the pre-emptive thread control, the final internal retention time "y" is proportional to the sum of the numbers of internal retention requests "$\Delta L$" for a micro period and is also proportional to "$\Delta L$". Therefore, the internal retention time "y" can be represented by the following Expression (6).

[Mathematical Formula 6]

$$Y \partial \Sigma \Delta L \partial \Delta L \quad (6)$$

When $\Delta L$ is removed from the above-mentioned Expression (5) and Expression (6), the following Expression (7) and Expression (8) are obtained.

[Mathematical Formula 7]

$$Y \partial \Sigma \Delta L \partial \Delta y \quad (7)$$

[Mathematical Formula 8]

$$\Delta y \partial Y \quad (8)$$

As can be seen from Expression (7), the internal retention time "$\Delta y$" to be increased at the infinitesimal time "$\Delta t$" is proportional to "$\Delta L$". As can be seen from Expression (8), the internal retention time "y" is proportional to the variation "$\Delta y$" in the internal retention time.

In this way, when the number of trials is sufficiently large, the relationship between "$\Delta y$" and "y" can be represented by the following differential equation.

[Mathematical Formula 9]

$$\frac{dy}{dL} = \beta \times y \quad (9)$$

When the differential equation represented by Expression (9) is solved, the following Expression (10) is obtained.

[Mathematical Formula 10]

$$y = a \times e^{\beta L} \quad (10)$$

Expression (10) can change to the following Expression (11) if the average internal retention time when the number of internal retention requests "L" is "0" is "p" and the reciprocal of the coefficient "β" is "q" and the above-mentioned Expression (1) is obtained.

[Mathematical Formula 11]

$$y = p \times e^{\left(\frac{L-1}{q}\right)} \text{ {if } } L \leq M \quad (11)$$

Expression (11) indicates the "internal retention time" of the processes which share resources (for example, a central processing unit (CPU), a disk, and the "Ready Queue" consumed by the "Execute Thread") managed by a pre-emptive thread control mechanism.

Then, the approximate equation of the internal retention time "y" is calculated when the number of internal retention requests "L" is equal to or greater than the maximum number of simultaneous executions "M". When L≥M is satisfied, the M/M/C queuing model can be applied. The approximate equation of the internal retention time "y" by the M/M/C queuing model can be represented by the following Expression (12).

[Mathematical Formula 12]

$$y = c + d \times \frac{L-M}{M} \quad (12)$$

Here, a constant term "c" indicates the average internal retention time when the number of internal retention requests "L" is equal to the maximum number of simultaneous executions "M". The internal retention time "y" can be obtained by the following calculation: a value "L−M" (indicating the maximum queue length) obtained by subtracting the maximum number of simultaneous executions "M" from the number of internal retention requests "L" is divided by the maximum number of simultaneous executions "M"; the division result is multiplied by a coefficient "d"; and the constant term "c" is added to the multiplication result. In the M/M/C queuing model, the maximum number of simultaneous executions is referred to as the number of processing windows.

When a coefficient "r" for connecting the calculation result when "L=M" is established in Expression (12) to the approximate equation represented by Expression (1) is introduced, the following Expression (13) is derived.

[Mathematical Formula 13]

$$y = f(M, L) + (r \times f(M, L)) \times \frac{L-M}{M} \quad \{\text{if } L \geq M\} \quad (13)$$

When "f(M,L)" in Expression (13) is replaced with Expression (1), the following Expression (14) is obtained. Therefore, the above-mentioned Expression (2) is obtained.

[Mathematical Formula 14]

$$y = p \times e^{\left(\frac{M-1}{q}\right)} + \left(r \times p \times e^{\left(\frac{M-1}{q}\right)}\right) \times \frac{L-M}{M} \quad \{\text{if } L \geq M\} \quad (14)$$

The coefficients "p", "q", and "r" included in Expression (1) and Expression (2) can be calculated as follows. First, the operation data of the web system 2 is collected and the internal retention time for the amount of load (the number of internal retention requests) is extracted from the collected operation data. For example, the internal retention time "$y_i$" when the amount of load is "$L_i$" is extracted from the operation data of the web system 2.

Then, the coefficients "p" and "q" are calculated by regression analysis using the amount of load (the number of internal retention requests) "$L_k$" that is less than the current maximum number of simultaneous executions "M" set in the web system 2, the logarithmic value "Log ($y_k$)" of the internal retention time at the amount of load (the number of internal retention requests) "$L_k$", and Expression (1) when L<M is satisfied, among the extracted amounts of load "$L_i$" and the internal retention time "$y_i$".

In addition, a coefficient 6 is calculated by regression analysis using the amount of load (the number of internal retention requests) "$L_i$" that is greater than the current maximum number of simultaneous executions "M" set in the web system 2, the internal retention time "$y_i$" at the amount of load (the number of internal retention requests) "$L_i$", and Expression (15) when L≥M is satisfied, among the calculated coefficients "p" and "q" and the amount of load (the number of internal retention requests) "$L_i$" and the internal retention time "$y_i$" which are extracted from the operation data. Then, a linear equation represented by Expression (16) which is established on condition that Expression (1) and Expression (2) intersect each other at "L=M" is solved to calculate the coefficient "r".

[Mathematical Formula 15]

$$y = p \times e^{\left(\frac{M-1}{q}\right)} + \delta \times (L - M) \quad \{\text{if } L \geq M\} \quad (15)$$

[Mathematical Formula 16]

$$p \times e^{\left(\frac{M-1}{q}\right)} + \delta \times (L-M) = p \times e^{\left(\frac{M-1}{q}\right)} + \left(r \times p \times e^{\left(\frac{M-1}{q}\right)}\right) \times \frac{(L-M)}{M} \quad (16)$$

Next, the properties of the "internal retention time" in the multi-stage queuing model will be described.

Figure 4:
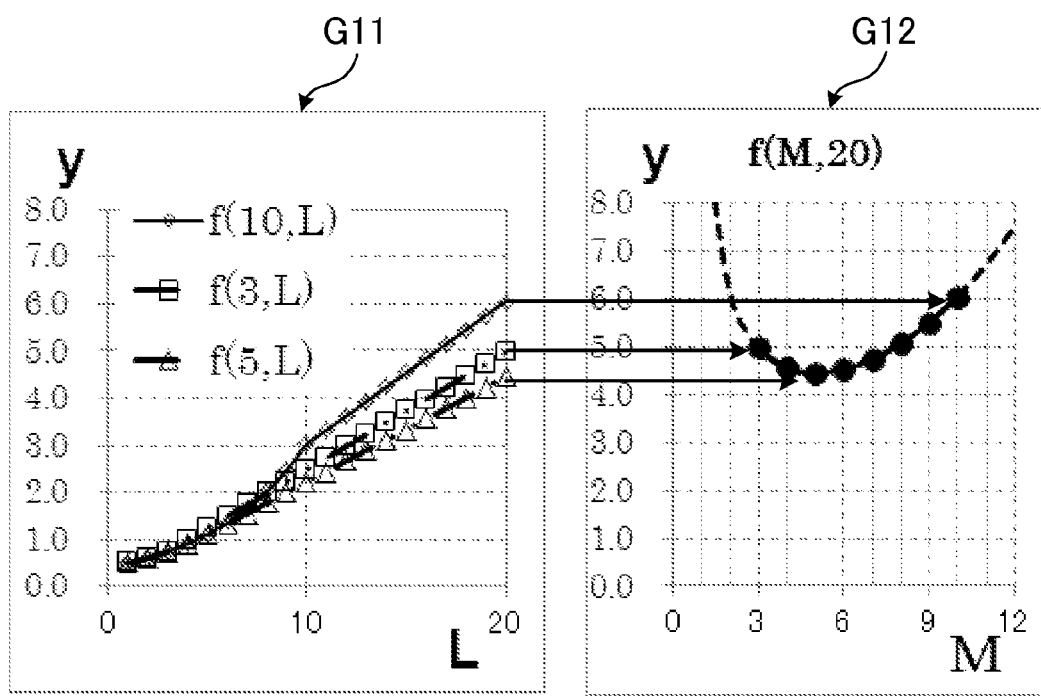
FIG. 4 is a diagram illustrating the properties of the internal retention time.

FIG. 4 is a diagram illustrating the properties of the internal retention time. A graph G11 illustrated on the left side of FIG. 4 indicates the internal retention time "y=f(M, L)" with respect to the amount of load (the number of internal retention requests) "L" when the data processing structure of the web system 2 is the multi-stage queuing model and the maximum number of simultaneous executions "M" in Expression (11) and Expression (14) are changed to "M=3", "M=5", and "M=10".

For example, in the left graph G11, f(10, L) is a graph indicating the internal retention time "y" with respect to the amount of load "L" when "M=10" is established. In the range (L<10) in which the amount of load "L" is less than the maximum number of simultaneous executions "M=10", f(10, L) is represented by Expression (1). When "L" is considered as a variable, Expression (1) is an exponential function. Therefore, in the range in which L<10 is satisfied, f (10, L) is exponentially changed.

In addition, in the range (L≥M) in which the amount of load "L" is equal to or greater than the maximum number of simultaneous executions "M=10", f(10, L) is represented by Expression (2). When "L" is considered as a variable, Expression (2) is a linear function. Therefore, in the range in which L≥10 is satisfied, f(10, L) is linearly changed. Similarly, f (3, L) and f (5, L) are exponentially and linearly changed, using L=3 and L=5 as the boundaries, respectively.

A graph G12 illustrated on the right side of FIG. 4 indicates the internal retention time "y=f (M, L)" with respect to the maximum number of simultaneous executions "M" when the data processing structure of the web system 2 is the multi-stage queuing model and the amount of load "L" is fixed to "L=20".

For example, When the amount of load "L" is constant (L=20) and the maximum number of simultaneous executions "M" is changed in Expression (2), the internal retention time "y" has a boat-shaped curve, as represented in the graph G12. That is, the internal retention time "y" has the minimum value with respect to the maximum number of simultaneous executions "M".

The reason is as follows. When the maximum number of simultaneous executions "M" is set to a value less than the optimum value (in FIG. 4, M=5), the waiting time of the processing request in the queue increases. In addition, when the maximum number of simultaneous executions "M" is set to a value greater than the optimum value (in FIG. 4, M=5), the processing efficiency of the web servers 2a and 2b is reduced in data processing after the processing request is extracted from the queue.

When the maximum number of simultaneous executions "M" is considered as a variable, as described above, the internal retention time "y" can be represented by the sum of an exponential function and a linear function illustrated in Expression (2) and has one minimum point. Therefore, "M" at which the internal retention time "y" is the minimum can be calculated by the condition that an expression obtained by differentiating Expression (2) with respect to "M" is "0".

[Mathematical Formula 17]

$$\frac{dy}{dM} = p \times e^{\left(\frac{M-1}{q}\right)} \times \frac{((r-1) \times M^2 + L \times r \times (q-M))}{q \times M^2} \quad (17)$$

To the right side of the Expression (17) becomes "0", it is necessary left side of the molecules of Expression (17) is "0". Thus, such that the molecular moiety of formula (17) is "0", by solving the quadratic equation for M, the maximum concurrency number "M", the next internal holding time "y" is the minimum value can be calculated by Expression (18).

[Mathematical Formula 18]

$$M = \left(\frac{L \times r \pm \sqrt{(L^2 - 4 \times L \times q) \times r^2 + 4 \times L \times q \times r}}{2 \times (r-1)}\right) \quad (18)$$

(where r≠1 is established)

When it is assumed that the amount of load "L" of the web system 2 is sufficiently greater than the maximum number of simultaneous executions "M" (for example, "L" is equal to or greater than two times M), the appropriate value of the maximum number of simultaneous executions is "M=q" rather than the limit value of L in the following Expression (19).

[Mathematical Formula 19]

$$M = \lim_{L \to \infty} \left(\frac{L \times r \pm \sqrt{(L^2 - 4 \times L \times q) \times r^2 + 4 \times L \times q \times r}}{2 \times (r-1)}\right) = q \quad (19)$$

(where r≠1 is established)

That is, when the amount of load "L" of the web system 2 is sufficiently greater than the maximum number of simultaneous executions "M", the denominator "q" of an exponential part in the approximate equation represented by Expression (1) or Expression (2) is calculated (when "q" is a decimal, for example, the decimal is rounded to the nearest whole number) to calculate the maximum number of simultaneous executions "M" at which the internal retention time "y" is the minimum. When "r=1" is established, "M=q" is established by the numerator part of Expression (17). In addition, "r=1" is established when the type of content of processing which is started by a request from the web system 2 is uniform.

Even when the amount of load "L" of the web system 2 is not sufficiently greater than the maximum number of simultaneous executions "M", for example, it is possible to simulate and calculate the maximum number of simultaneous executions "M" at which the value of the internal retention time "y" in Expression (2) with respect to the amount of load assumed in the web system 2 (for example, the amount of load assumed in the web system 2 is the number of internal retention requests which is designated as one of the tuning policy parameters by the administrator of the web system 2).

For example, the amount of load "L" assumed in the web system 2, which is designated as one of the tuning policy parameters, is substituted into Expression (2) and some candidate values of the maximum number of simultaneous executions "M" are substituted into Expression (2) as illustrated in the graph G12 of FIG. 4. Then, the maximum number of simultaneous executions "M" at which the internal retention time "y" is the minimum is used as a new maximum number of simultaneous executions.

Figure 22:
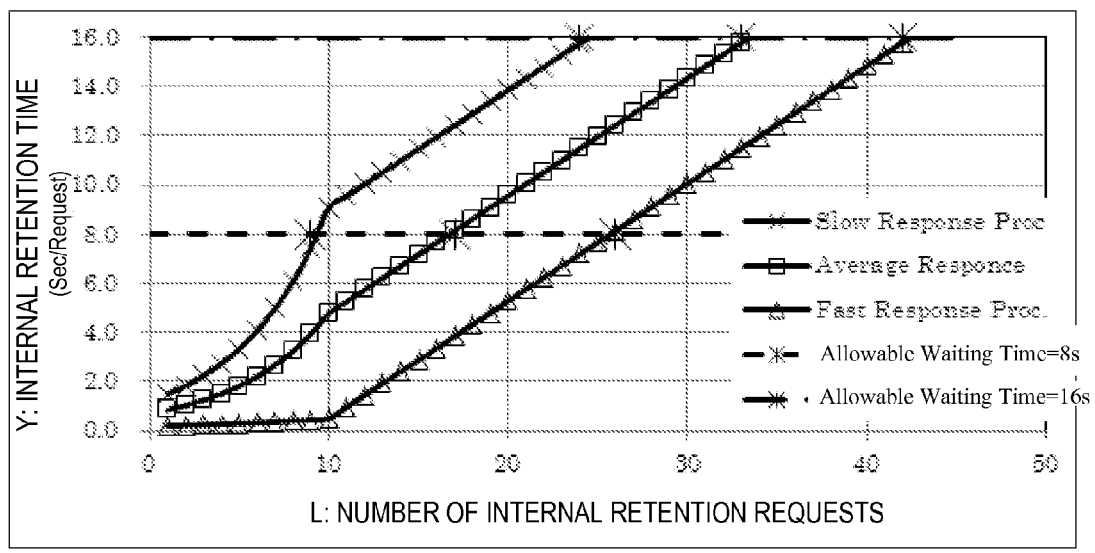
FIG. 22 is a diagram illustrating the calculation of a maximum queue length by an allowable waiting time.

The maximum queue length (queue size) which is one capacity control parameter is calculated by "$L_{Limit}$–M"– Here, "$L_{Limit}$" is, for example, the maximum amount of load assumed in the web system 2 and "M" is the maximum number of simultaneous executions which is newly calculated. In addition, as "$L_{Limit}$", a value that is not greater than the allowable limit "$Y_{Limit}$" of the internal retention time given as the tuning policy parameter can be calculated by changing "L" in Expression (2), as illustrated in FIG. 22.

When "$L_{Limit}$–M" is a negative value, the maximum number of simultaneous executions "M" is the value of "$L_{Limit}$". In this case, the maximum queue length (queue size) is "0".

[Description of Data Processing Structure of Web System 2]

Next, various data processing structures of the web system 2 will be described.

Figure 5:
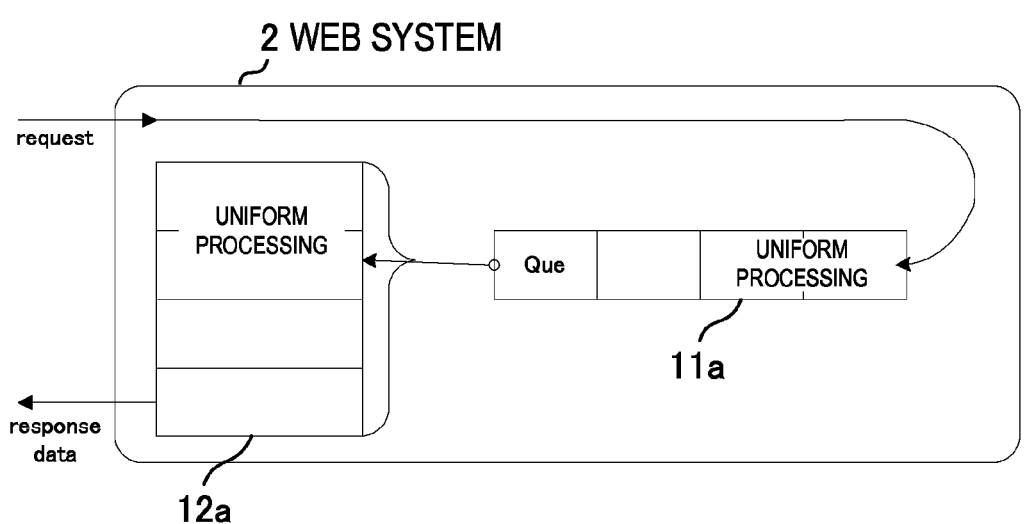
FIG. 5 is a diagram illustrating a first example of the data processing structure of a web system 2.

FIG. 5 is a diagram illustrating a first example of the data processing structure of the web system 2. As illustrated in FIG. 5, the web system 2 includes one queue 11a and one data processing unit 12a. For example, the process of the data processing structure illustrated in FIG. 5 physically operates on one or more web servers and the web system 2 includes one or more web servers.

The queue 11a temporarily stores processing requests. The processing requests are extracted one by one from the queue 11a and are input to the data processing unit 12a. The data processing unit 12a processes the processing requests extracted from the queue 11a in parallel. When the data processing unit 12a ends data processing for the processing requests, the next processing request stored in the queue 11a is input to the data processing unit 12a.

A request for the content of uniform processing is input to the web system 2 with the data processing structure illustrated in FIG. 5. Then, the data processing unit 12a performs uniform data processing. The request for the content of uniform processing means that the content of data processed by the data processing unit 12a is substantially the same.

For example, it is assumed that the data processing unit 12a performs data processing for processing requests a, b, and c. In the web system 2 illustrated in FIG. 5, data processing is performed for all of the processing requests a, b, and c substantially at the same internal processing time. That is, it is assumed that the processing requests for the same content of processing are input to the queue 11a of the web system 2 illustrated in FIG. 5. In particular, in the web system, when input data, such as HTTP_URi or http_query_string included in the HTTP request, is the same, the content of processing is the same.

Figure 6:
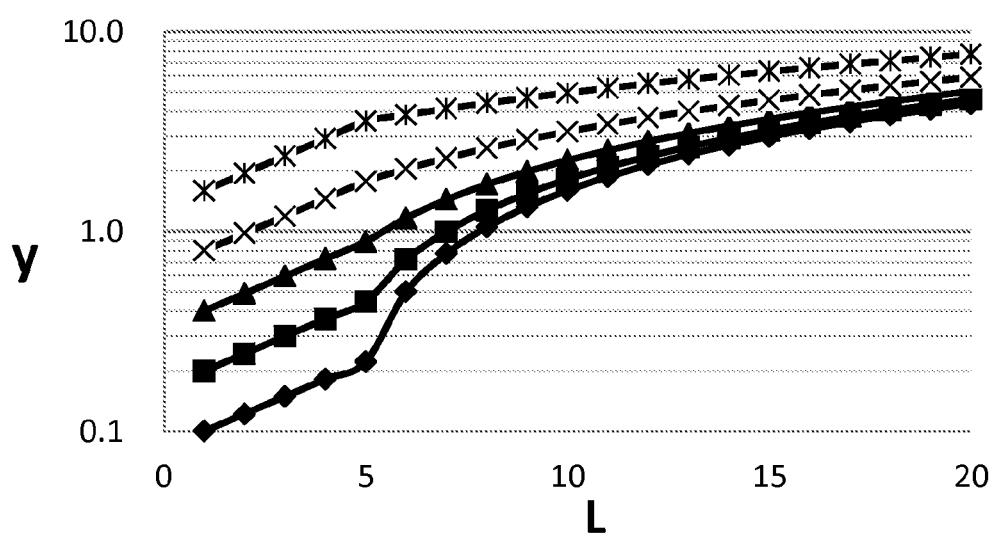
FIG. 6 is a diagram illustrating an internal retention time graph (logarithmic scale) for each amount of load with the content of uniform processing.
Figure 7:
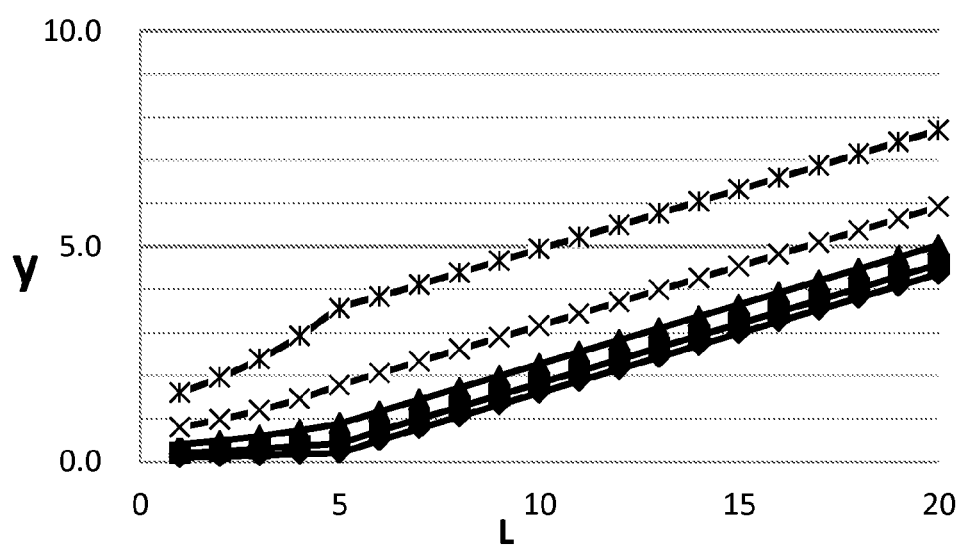
FIG. 7 is a diagram illustrating an internal retention time graph (linear scale) for each amount of load with the content of uniform processing.

Here, the following case is also regarded as the "content of uniform processing": all of the contents of processing are not the same, but the gradients of graphs are substantially equal to each other when the number of internal retention requests "L" is less than the set value "M" of the maximum number of simultaneous executions at the time the operation data is acquired and the internal retention time "y" is indicated by a logarithmic scale, as illustrated in FIG. 6. As illustrated in FIG. 7, when the number of internal retention requests "L" is equal to or greater than the set value "M" of the maximum number of simultaneous executions and the internal retention time "y" is indicated by a linear scale, the gradient of graphs tend to be substantially equal to each other.

The reason is as follows. In the case in which the number of internal retention requests "L" is less than set value "M" of the maximum number of simultaneous executions at the time the operation data is acquired and the exponential part coefficient "q" in Expression (1), which is the approximate equation of the internal retention time "y", has the same value, the improved value of set value "M" of the maximum number of simultaneous executions is a value obtained by rounding "q" to the nearest integer, even though the constant coefficient "p" of Expression (1) is different or even though the number of internal retention requests "L" is equal to or greater than the set value "M" of the maximum number of simultaneous executions at the time the operation data is acquired and "r" in Expression (2), which is the approximate equation of the internal retention time "y", is 1 or a value other than 1.

Figure 8:
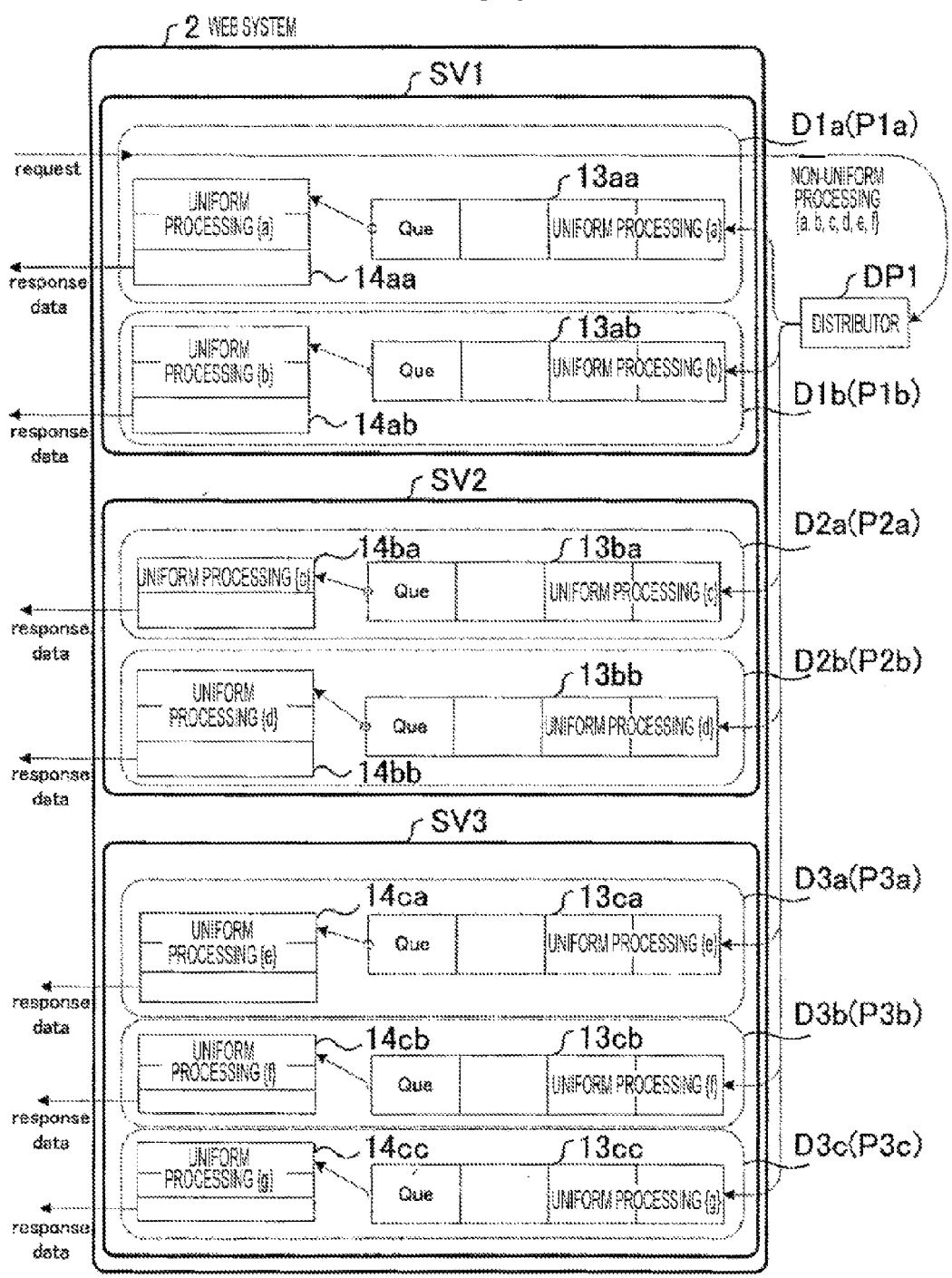
FIG. 8 is a diagram illustrating a second example of the data processing structure of the web system 2.

FIG. 8 is a diagram illustrating a second example of the data processing structure of the web system 2. As illustrated in FIG. 8, the web system 2 includes queues 13aa, 13ab, 13ba, 13bb, 13ca, 13cb, and 13cc, data processing units 14aa, 14ab, 14ba, 14bb, 14ca, 14cb, and 14cc, and a distributor DP1. The web system 2 with the data processing structure illustrated in FIG. 8 includes, for example, one or more web servers. In FIG. 8, the web system 2 includes web servers SV1 to SV3.

A set of one queue and one data processing unit illustrated in FIG. 8 is provided so as to correspond to the process performed by the web system 2 (the web servers SV1 to SV3 forming the web system 2).

For example, one queue 13aa and one data processing unit 14aa in a dotted frame D1a illustrated in FIG. 8 are provided so as to correspond to a process P1a. One queue 13ab and one data processing unit 14ab in a dotted frame D1b are provided so as to correspond to a process P1b. One queue 13ba and one data processing unit 14ba in a dotted frame D2a are provided so as to correspond to a process P2a. One queue 13bb and one data processing unit 14bb in a dotted frame D2b are provided so as to correspond to a process P2b. One queue 13ca and one data processing unit 14ca in a dotted frame D3a are provided so as to correspond to a process P3a. One queue 13cb and one data processing unit 14cb in a dotted frame D3b are provided so as to correspond to a process P3b. One queue 13cc and one data processing unit 14cc in a dotted frame D3c are provided so as to correspond to a process P3c.

In the data processing structure illustrated in FIG. 8, a request for the content of non-uniform processing is input to the web system 2. The non-uniform data process means that the processing times (internal retention times) of various processing requests are different from each other. Therefore, in the request for the content of non-uniform processing, the processing times (the contents of non-uniform processing) of the processing requests are different from each other.

In the data processing structure illustrated in FIG. 8, the requests for the content of non-uniform processing are distributed by the distributor DP1 such that the requests are uniformly processed by the processes (dotted lines D1a to D3c) of the web servers SV1 to SV3.

For example, it is assumed that requests a, b, c, d, e, and f for the content of non-uniform processing are input to the web system 2. Each of the processing requests a, b, c, d, e, and f is distributed to each of the processes (dotted lines D1a to D3c) of the web servers SV1 to SV3 by the distributor DP1. Therefore, the request for the content of uniform processing are input to each of the queues 13aa, 13ab, 13ba, 13bb, 13ca, 13cb, and 13cc. Then, each of the data processing units 14aa, 14ab, 14ba, 14bb, 14ca, 14cb, and 14cc processes the request for the content of uniform processing.

The data processing structure illustrated in FIG. 8 can be considered to have the queue 11a and the data processing unit 12a illustrated in FIG. 5 for each process.

Figure 9:
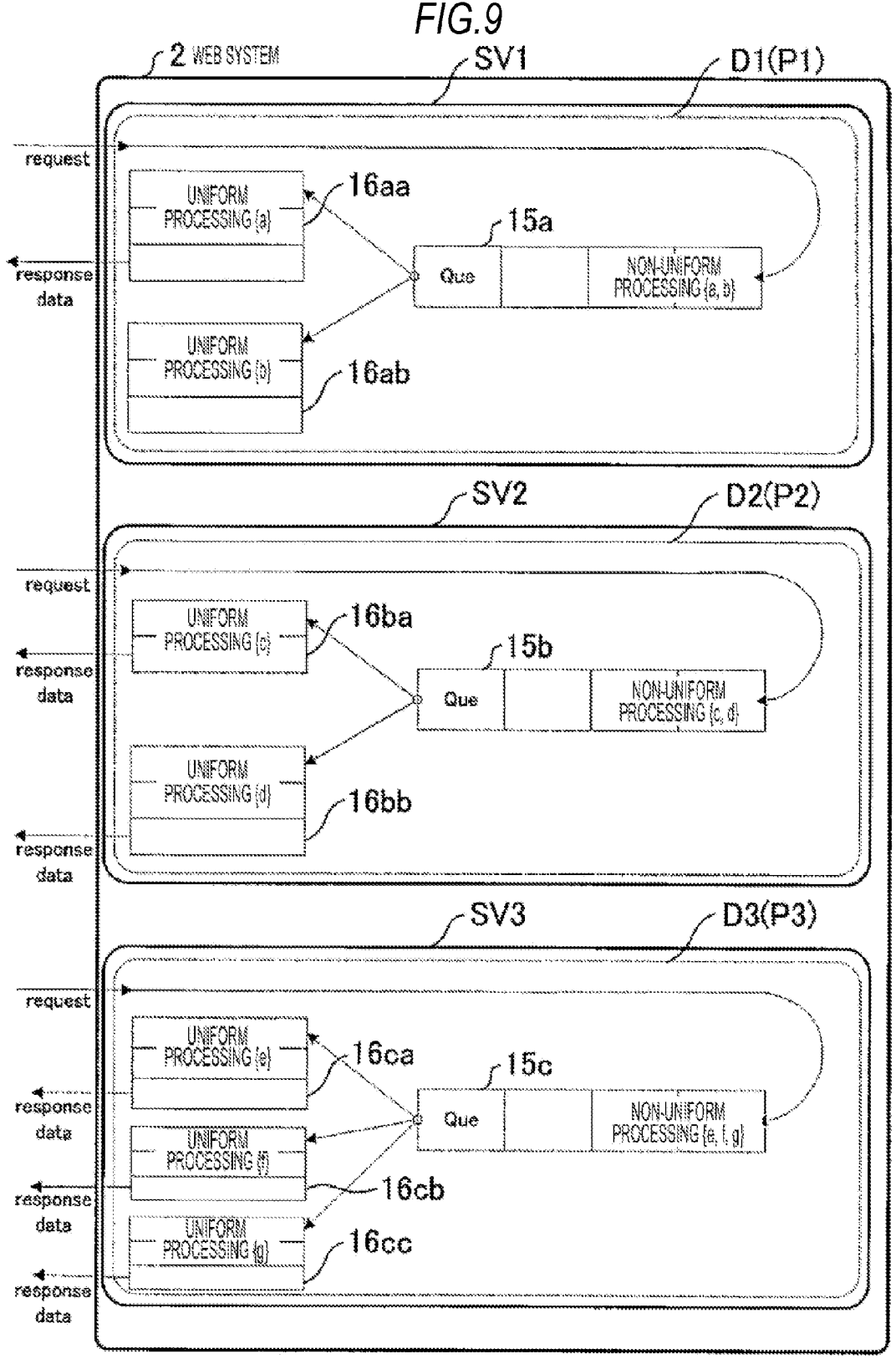
FIG. 9 is a diagram illustrating a third example of the data processing structure of the web system 2.

FIG. 9 is a diagram illustrating a third example of the data processing structure of the web system 2. As illustrated in FIG. 9, the web system 2 includes a plurality of queues 15a, 15b, and 15c and a plurality of data processing units 16aa, 16ab, 16ba, 16bb, 16ca, 16cb, and 16cc. The web system 2 with the data processing structure illustrated in FIG. 9 includes, for example, one or more web servers. In FIG. 9, the web system 2 includes web servers SV1 to SV3.

A set of one queue and a plurality of data processing units illustrated in FIG. 9 is provided so as to correspond to the process performed by the web system 2 (the web servers forming the web system 2).

For example, one queue 15a and two data processing units 16aa and 16ab in a dotted frame D1 illustrated in FIG. 9 are provided so as to correspond to a process P1. One queue 15b and two data processing units 16ba and 16bb in a dotted frame D2 are provided so as to correspond to a process P2. One queue 15c and three data processing units 16ca, 16cb, and 16cc in a dotted frame D3 are provided so as to correspond to a process P3.

In the data processing structure illustrated in FIG. 9, a request for the content of non-uniform processing is temporarily stored in a queue which is provided so as to correspond to the process. A request for the content of uniform processing is input to each of a plurality of data processing units 12c which is provided so as to correspond to each process.

For example, processing requests a and b for the content of non-uniform processing are temporarily stored in the queue 15a in the dotted frame D1 which is provided so as to correspond to the process P1. Only the processing request a is input to the data processing unit 16aa and only the processing request b is input to the data processing unit 16ab in the dotted frame D1. That is, the processing requests a and b are input to the two data processing units 16aa and 16ab in the dotted frame D1, respectively and uniform processing is performed.

FIG. 10 is a diagram illustrating a fourth example of the data processing structure of the web system 2. As illustrated in FIG. 10, the web system 2 includes a plurality of queues 17a, 17b, 17ca, and 17cb, a plurality of data processing units 18a, 18b, 18ca, and 18cb, and a distributor DP2. The web system 2 with the data processing structure illustrated in FIG. 10 includes, for example, one or more web servers. In FIG. 10, the web system 2 includes web servers SV1, SV2, SV3a, and SV3b.

A set of one queue and one data processing unit illustrated in FIG. 10 is provided so as to correspond to the process performed by the web system 2 (the web servers forming the web system 2).

For example, one queue 17a and one data processing unit 18a in a dotted frame D1 illustrated in FIG. 10 are provided so as to correspond to a process P1. One queue 17b and one data processing unit 18b in a dotted frame D2 are provided so as to correspond to a process P2. One queue 17ca and one data processing unit 18ca in a dotted frame D3a are provided so as to correspond to a process P3. One queue 17cb and one data processing unit 18cb in a dotted frame D3b are provided so as to correspond to a process P3.

In the data processing structure illustrated in FIG. 10, requests for the content of non-uniform processing are input to the web system 2. In the data processing structure illustrated in FIG. 10, the input requests for the content of non-uniform processing are distributed by the distributor DP2 without any change and are then output to the queues 17a, 17b, 17ca, and 17cb in the dotted frames D1 to D3b.

For example, as illustrated in FIG. 10, it is assumed that requests a, b, c, d, e, and f for the content of non-uniform processing are input to the web system 2. The requests a, b, c, d, e, and f for the content of non-uniform processing are distributed by the distributor DP2 and the processing requests a and b are output to the queue 17a of the web server SV1. That is, the requests a and b for the content of non-uniform processing are input to the queue 17a. Then, the data processing unit 18a performs data processing for the requests a and b for the content of non-uniform processing.

In addition, the requests c and d for the content of non-uniform processing are output to the queue 17b of the web server SV2. That is, the requests c and d for the content of non-uniform processing are input to the queue 17a. Then, the data processing unit 18a performs data processing for the requests c and d for the content of non-uniform processing.

The requests e, f, and g for the content of non-uniform processing are output to the queue 17ca of the web server SV3a. That is, the requests e, f, and g for the content of non-uniform processing are input to the queue 17ca. Then, the data processing unit 18ca performs data processing for the requests e, f, and g for the content of non-uniform processing.

The requests e, f, and g for the content of non-uniform processing are output to the queue 17cb of the web server SV3b. That is, the requests e, f, and g for the content of non-uniform processing are input to the queue 17cb. Then, the data processing unit 18cb performs data processing for the requests e, f, and g for the content of non-uniform processing.

In FIG. 10, two web servers SV3a and SV3b which execute the process P3 perform data processing for the requests e, f, and g for the content of non-uniform processing.

As illustrated in FIGS. 5 to 10, the data processing structure of the web system 2 can be generally classified into four data processing structures.

[Description of Calculation of Capacity Control Parameter According to Data Processing Structure of Web System 2]

FIG. 11 is a diagram illustrating an example of the functional block of the information processing apparatus 1. As illustrated in FIG. 3, the information processing apparatus 1 includes a receiving unit 21, an extraction unit 22, a coefficient calculation unit 23, a parameter calculation unit 24, a transmitting unit 25, and a storage unit 26.

For example, the receiving unit 21 receives tuning policy parameters related to the web system 2 from the administrator of the web system 2 through a terminal apparatus. For example, the receiving unit 21 receives the amount of load assumed in the web system 2. In addition, the receiving unit 21 receives operation data (log data) from the web system 2. The receiving unit 21 receives the capacity control parameter which is currently set in the web system 2 from the web system 2.

FIG. 12 is a diagram illustrating an example of the operation data of the web system 2. In FIG. 12, a field which describes operation data 31 is illustrated on the right side of the operation data 31.

The operation data 31 includes the reception time when the web system 2 receives the processing request from the terminal apparatus 3. In addition, the operation data 31 includes the end time when the web system 2 performs data processing for the processing request and transmits response data to the terminal apparatus 3. The operation data 31 also includes information about the process in which the web system 2 performs data processing for the processing request.

When the system is extended such that the same information as that illustrated in FIG. 13 can be extracted, another example of the operation data of the web system 2 may be a format based on an "extended log file format" which is defined by the World Wide Web Consortium. For example, "Hitachi Web Server" manufactured by Hitachi, Ltd. can be extended and applied so as to display the time (% T) required to process the request and the start time (% t) when the request processing starts on the millisecond time scale.

Returning to FIG. 11, the extraction unit 22 extracts the average value of the internal retention times, which is required for the web system 2 to perform data processing for the processing requests, for each number of internal retention requests from the operation data received by the receiving unit 21. That is, the extraction unit 22 extracts the internal retention time of the web system 2 for the amount of load of the web system 2 from the operation data of the web system 2. In addition, the extraction unit 22 extracts temporary information from the received operation data of the web system 2 and extracts the internal retention time of the web system 2 for the amount of load of the web system 2 from the extracted temporary information.

FIG. 13 is a diagram illustrating the extraction of the temporary information. The extraction unit 22 extracts the temporary information illustrated in FIG. 13 from the received operation data of the web system 2. The temporary information includes a reception time 32a, an end time 32b, an internal retention time 32c, the content of an HTTP request (an http_method 32d, an http_uri 32e, and an http_query_string 32f), a process identification information (an http_uriGroupName 32g, an http_queryID 32h, an http_status 32i, a remote_addr 32j, and a remote_port 32k), the number of internal retention requests 321 for each process identifier, and the number of internal retention requests 32m for each process.

The extraction unit 22 extracts the reception time 32a when the web system 2 receives a URL and the end time 32b when data processing for the URL ends from the operation data of the web system 2 received by the receiving unit 21. The extraction unit 22 calculates the internal retention time 32c of the URL from the extracted reception time 32a and end time 32b.

The extraction unit 22 extracts the http_method 32d, the http_uri 32e, and the http_query_string 32f from the operation data of the web system 2 received by the receiving unit 21. The http_method 32d indicates the properties of an HTTP request. The http_uri 32e indicates a URL. The http_query_string 32f indicates a query string.

The extraction unit 22 extracts the http_uriGroupName 32g from the http_uri 32e extracted from the operation data, on the basis of a predetermined rule which will be described below. In some cases, unique information is added to the http_uri 32e even when the content of processing is the same. The extraction unit 22 removes the unique information and extracts the http_uriGroupName 32g such that the http_uri 32e indicating the same content of processing has the same process identification information. That is, the extraction unit 22 is configured such that the same process identification information is given to the URL indicating the same content of processing.

Similarly, the extraction unit 22 extracts the http_queryID 32h from the http_query_string 32f extracted from the operation data on the basis of a predetermined rule which will be described below. In some cases, unique information is added to the http_query_string 32f even when the content of processing is the same. The extraction unit 22 removes the unique information and extracts the http_queryID 32h such that the http_query_string 32f indicating the same content of processing has the same process identification information. That is, the extraction unit 22 is configured such that the same process identification information is given to the query string indicating the same content of processing.

As such, since the same process identification information is given to the processing request for the same content of processing, the processing requests are classified into some types. For example, the operation data 31 (as raw data) illustrated in FIG. 12 is classified into thousands to tens of thousands of types. The types of processing requests are reduced to, for example, tens to hundreds of types by giving the same process identification information to the URL on which the same processing is performed and giving the same process identification information to the query string on which the same processing is performed, on the basis of a predetermined rule.

The extraction unit 22 extracts the http_status 32i from the operation data. The http_status 32i is an http status code.

The extraction unit 22 extracts the remote_addr 32j from the operation data on the basis of a predetermined rule which will be described below. The remote_addr 32j is the identifier of the web server forming the web system 2.

The extraction unit 22 extracts the http_port 32k from the operation data. The http_port 32k is an http remote port.

The extraction unit 22 extracts the number of internal retention requests 321 for each process identifier from the operation data. Here, the process identifier is indicated by the http_uriGroupName 32g and the http_queryID 32h. That is, the http_uriGroupName 32g and the http_queryID 32h form one information item. When the content of the information item is different, the process identifier is also different. That is, the types of processing requests are classified by the http_uriGroupName 32g and the http_queryID 32h. Therefore, the extraction unit 22 examines process multiplexing (the number of internal retention requests) for each process identifier in the unit of information indicated by the http_uriGroupName 32g and the http_queryID 32h (in the unit of the process identifier), with reference to the reception time 32a and the end time 32b, and extracts the number of internal retention requests 321 for each process identifier.

The extraction unit 22 extracts the number of internal retention requests 321 for each process from the operation data. Here, the process is indicated by the remote_addr 32j and the remote_port 32k. That is, the remote_addr 32j and the remote_port 32k form one information item. When the content of the information item is different, the process which processes the processing request is different. Therefore, the extraction unit 22 examines process multiplexing (the number of internal retention requests) for each process in the unit of information indicated by the remote_addr 32j and the remote_port 32k (in the unit of the process), with reference to the reception time 32a and the end time 32b, and extracts the number of internal retention requests 321 for each process.

FIG. 14 is a diagram illustrating the predetermined rule. An extraction designation parameter designating an information extraction method is written in a field 33a in FIG. 14. The description of the extraction designation parameter is written in a field 33b. For example, the extraction unit 22 is given the extraction designation parameter in the field 33a to generate the http_uriGroupName 32g from the operation data. Therefore, the extraction unit 22 can give the same process identification information to the URL indicating the same content of processing. This holds for, for example, the http_queryID 32h.

In the data processing structure illustrated in FIG. 10, the web servers SV3a and SV3b process the same processing request. Therefore, the extraction designation parameter is set such the same identifier is allocated to the web servers SV3a and SV3b. That is, the processes performed by the web servers SV3a and SV3b have the same identification information (the remote_addr 32j and the remote_port 32k).

Figure 15:
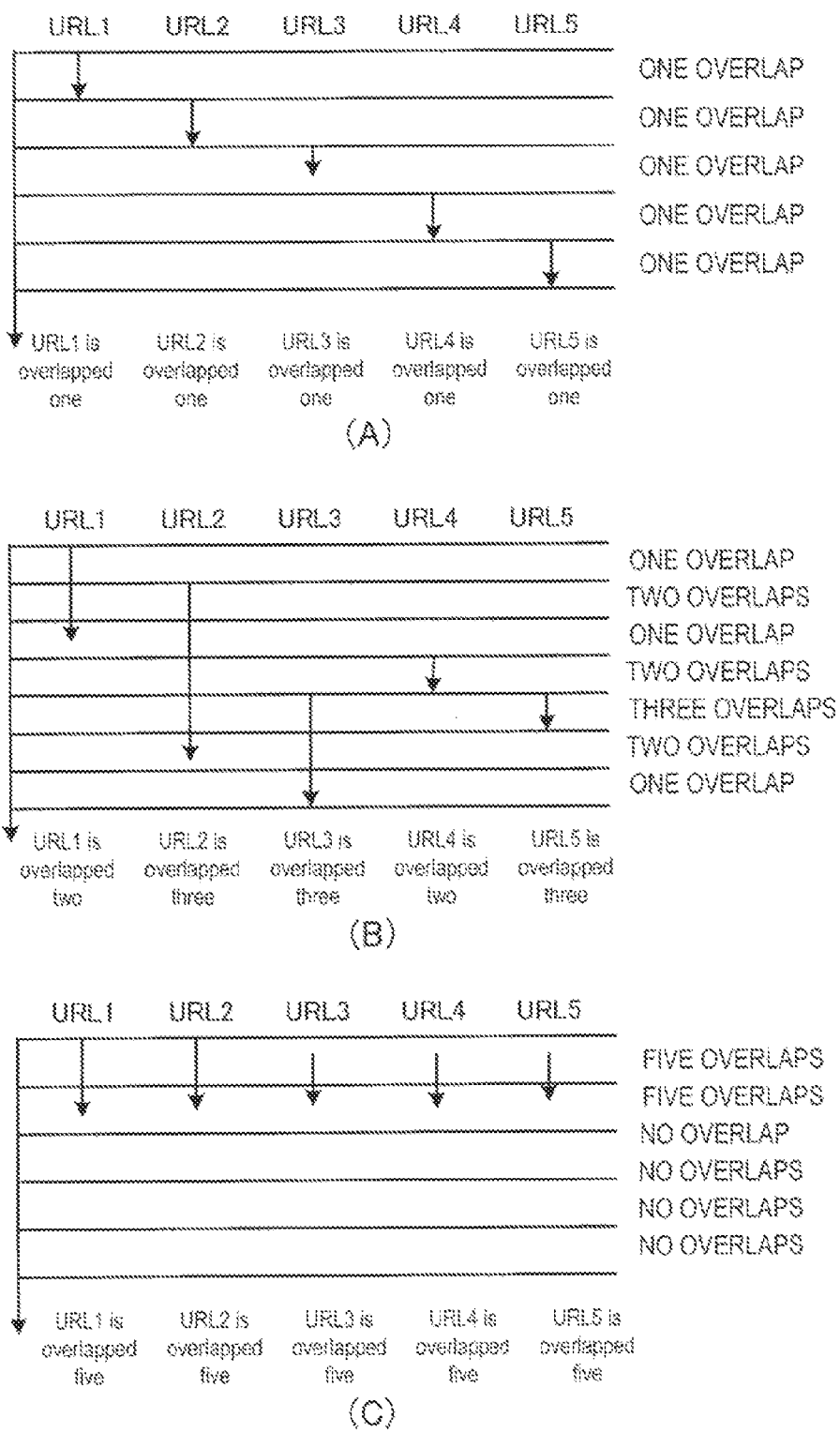
FIGS. 15(A) to 15(C) are diagrams illustrating the number of internal retention requests of a URL.

FIGS. 15(A) to 15(C) are diagrams illustrating the number of URL internal retention requests. Here, an example of counting the number of internal retention requests for each URL will be described.

In FIGS. 15(A) to 15(C), a starting point of an arrow corresponds to the reception time 32a of the URL and an end point thereof corresponds to the end time 32b of the processing of the URL. It is assumed that, when the processing of a URL does not overlap the processing of any URL, the number of overlaps of the URLs is 1. In addition, the maximum number of overlaps of the URLs is adopted and is used as the number of internal retention requests.

In FIG. 15(A), the number of internal retention requests of each of URL1 to URL5 is "1".

In FIG. 15(B), the number of internal retention requests of URL1 is "2". The number of internal retention requests of URL2 is "3". The number of internal retention requests of URL3 is "3". The number of internal retention requests of URL4 is "2". The number of internal retention requests of URL5 is "3".

In FIG. 15(C), the number of internal retention requests of each of URL1 to URL5 is "5".

In this way, the extraction unit 22 extracts the number of internal retention requests 321 for each of the URLs which are differently processed. The above-mentioned method is similarly applied to the extraction of the number of internal retention requests 321 for each process identifier and the extraction of the number of internal retention requests 32m for each process which have been described with reference to FIG. 13.

As described above, the extraction unit 22 counts the maximum number of URLs, in which the periods from the start time to the end time overlap each other, extracted from the operating data and uses the count value as the number of internal retention requests. However, the number of internal retention requests can be extracted by other methods. For example, the extraction unit 22 may divide the sum of the running times of the URLs, in which the periods from the start time to the end time overlap each other, by the processing time of each URL to calculate the average number of internal retention requests.

The calculation of the number of internal retention requests is the calculation of the number of resources, which are managed by the capacity control parameters (the maximum number of simultaneous executions and the queue length) in the data processing structure of the web system 2 that is an application target, by the simulation of the data processing structure. Therefore, when the processing of another request data item whose reception time is later than the reception of the request data is completed earlier than the processing of the request data, the number of internal retention requests is calculated as the request which is temporarily stored in an independent queue.

When a plurality of web servers form the web system 2, the clocks of the web servers do not indicate the same time in some cases. In this case, it is necessary to sequentially perform processing for the web servers in order to extract the accurate number of internal retention requests from the operation data of the web servers with the clocks which indicate different times.

As described above, the extraction unit 22 extracts temporary information from the request data for the operation data once, compares the extracted information with request data which runs during a period that overlaps the period from the start time to the end time of the request data, calculates the number of internal retention requests for each process and the number of internal retention requests for each process identifier during the request data running time in the web system 2, and records the obtained data as the data illustrated in FIG. 13 in one-to-one correspondence with the request data for the operation data.

FIG. 13 is a diagram illustrating an example of the data structure indicating the first extraction result of the extraction unit 22.

Here, when the "http_status $32i$" includes in the process identification information string illustrated in FIG. 13 is a record of the internal retention time which is not controlled by the capacity control parameter, such as an "error response time", it may be removed in the early stage.

A combination of the "remote_addr $32j$" and the "remote_port $32k$" in the columns included in the process identification information string illustrated in FIG. 13 is particularly referred to as "identification information for each process". Combinations of other columns are used to generate a "process identifier" according to the extraction conditions of the process identifier which is given as the tuning policy parameter.

For data for the number of records which are in one-to-one correspondence with the request data for the operation data illustrated in FIG. 13, the average value of the internal retention times is calculated for each combination of the "identification information for each process" and "the number of internal retention requests $32m$ for each process" and each combination of the "process identifier" and "the number of internal retention requests for each process identifier" to obtain data with the structure illustrated in FIG. 16.

Information for regression analysis illustrated in FIG. 16 is extracted from the temporary information illustrated in FIG. 13 by the process of the extraction unit 22 and is then stored in the storage unit 26.

Identification information $34a$ illustrated in FIG. 16 includes identification information for each process and identification information for each process identifier. The identification information $34a$ for each process corresponds to the remote_addr $32j$ and the remote_port $32k$ illustrated in FIG. 13. The identification information $34a$ for each process identifier corresponds to the http_uriGroupName $32g$ and the http_queryID $32h$ illustrated in FIG. 13. In addition, the identification information $34a$ for each process identifier includes information about the process in which the process identifier is processed. For example, a process identifier "/context001/svcName99;pgCode=xxP11" indicated by an arrow A23 is processed by a process "/context001/svcName99;pgCode=xxP11". The value of the identification information $34a$ illustrated in FIG. 16 is a character string obtained by connecting some components of the "process identification information" illustrated in FIG. 13 according to the condition which is given as the tuning policy parameter. Hereinafter, the identification information $34a$ in a row corresponding to each process is referred to as the process identifier of the process.

The average value $34c$ of the internal retention times for each number of internal retention requests indicates the average value of the internal retention time of the web system 2 for the number of internal retention requests (the amount of load). For example, in the example illustrated in FIG. 16, when the number of internal retention requests is "2", the average value of the internal retention time of the process indicated by an arrow A21 is "0.347". When the number of internal retention requests is "3", the average value of the internal retention time is "0.426".

When the number of internal retention requests is "2", the average value of the internal retention time of the process identifier indicated by arrow A23 is "16.674". When the number of internal retention requests is "3", the average value of the internal retention time is "27.518".

In FIG. 16, an empty field indicates that the corresponding number of internal retention requests is absent in the operation data received from the web system 2 (for example, no internal retention request is generated in the range of the operation data received from the web system 2).

Here, among the data items illustrated in FIG. 16 which are recorded according to the condition given as the tuning policy parameter, data which is not used as the information for regression analysis may be removed. Alternatively, as a customizable removal method, the following method may be used: data which does not use, as the information for regression analysis, the average internal retention time of the number of internal retention requests that is equal to or less than 1 or the average internal retention time of the number of internal retention requests that is equal to the maximum number of simultaneous executions "M" during the acquisition of the operation data may be removed.

Returning to FIG. 11, the coefficient calculation unit 23 calculates the coefficients of the approximate equation, on the basis of the approximate equation corresponding to the data processing structure of the web system 2 and the information for regression analysis extracted by the extraction unit 22. In addition, the coefficient calculation unit 23 calculates preliminary coefficients, using Expression (1) as an approximate equation when the number of internal retention requests is less than the maximum number of simultaneous executions, and selects an approximate equation corresponding to the data processing structure of the web system 2 on the basis of the calculated preliminary coefficients. The calculation of the preliminary coefficients and the coefficients of the approximate equation will be described in detail below with reference to a flowchart.

The parameter calculation unit 24 calculates the new maximum number of simultaneous executions and a new maximum queue length of the web system 2 from the approximate equation whose coefficients have been calculated by the coefficient calculation unit 23. The calculation of the new maximum number of simultaneous executions and the new maximum queue length of the web system 2 will be described in detail below with reference to a flowchart.

The transmitting unit 25 transmits the maximum number of simultaneous executions and the maximum queue length calculated by the parameter calculation unit 24 to the web system 2 (the web servers $2a$ and $2b$ forming the web system 2).

The information for regression analysis is stored in the storage unit 26.

Figure 17:
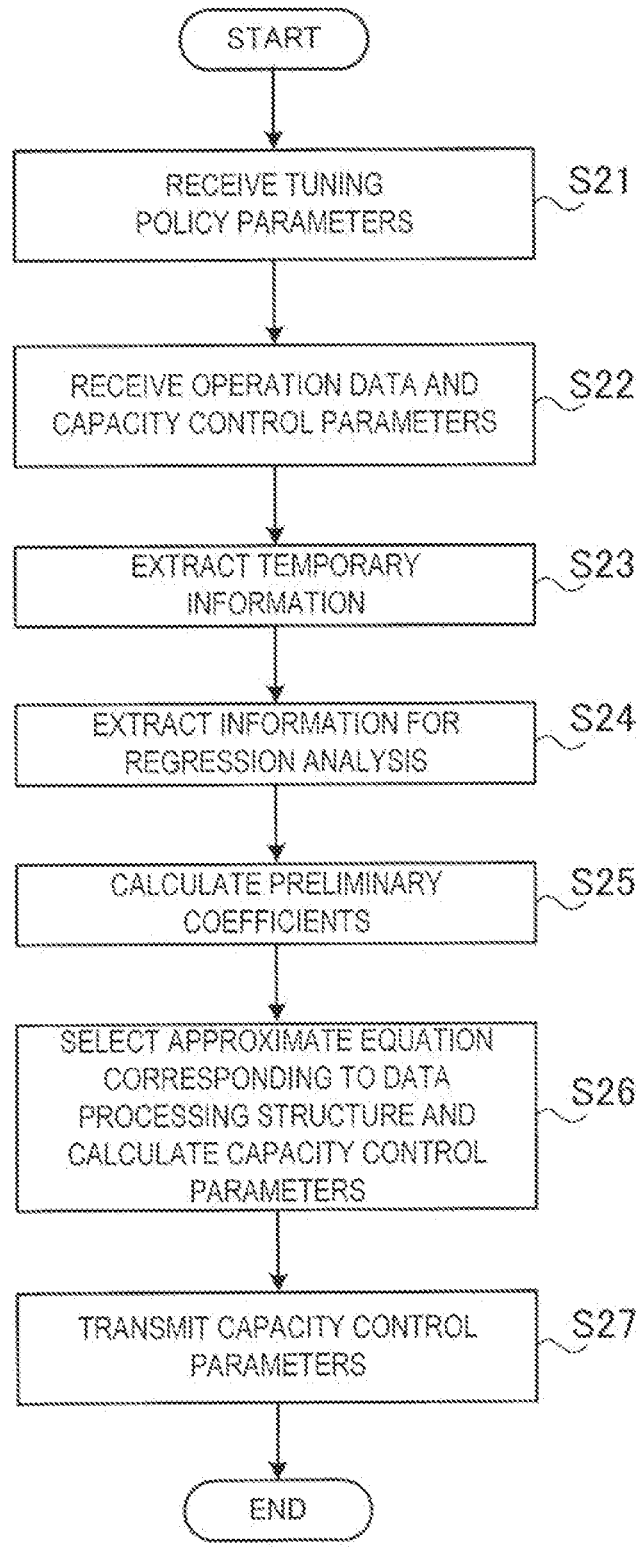
FIG. 17 is a flowchart illustrating an example of the operation of the information processing apparatus 1.

FIG. 17 is a flowchart illustrating an example of the operation of the information processing apparatus 1. The flowchart illustrated in FIG. 17 is performed in response to, for example, a start instruction from the administrator of the web system 2.

First, the receiving unit 21 receives the tuning policy parameters of the web system 2 from the administrator of the web system 2 (step S21). The tuning policy parameters of the web system 2 include, for example, the internal retention time "$y_{Limit}$" which is allowed in the web system 2.

Then, the receiving unit 21 receives the operation data and the capacity control parameter which is currently set in the web system 2 from the web system 2 (step S22).

Then, the extraction unit 22 extracts temporary information on the basis of the operation data received from the web system 2 (step S23). For example, the extraction unit 22 extracts the temporary information illustrated in FIG. 13 on the basis of the extraction designation parameter illustrated in FIG. 14.

Then, the extraction unit 22 extracts the information for regression analysis from the temporary information extracted from the operation data (step S24). For example, the extraction unit 22 extracts the information for regression analysis illustrated in FIG. 16.

Then, the coefficient calculation unit 23 calculates the preliminary coefficients "p and q" of the preliminary approximate equation 34b illustrated in FIG. 16 from the average internal retention time for the number of internal retention requests "L" for each process, which is less than the maximum number of simultaneous executions "M" during the acquisition of the operation data in the information for regression analysis illustrated in FIG. 16 extracted by the extraction unit 22, using regression analysis having Expression (1) as the approximate equation, before the data processing structure of the web system 2 is determined (step S25).

Here, a general expression of the approximate equation of the "internal retention time" is represented by Expressions (1) and (2), as described above. Therefore, "p, q, and r" in Expressions (1) and (2) are replaced with constants "$a_i$, $b_i$, and $c_i$" for each process identifier "i" and the approximate equation of the "internal retention time" for each process identifier is represented by the following Expressions (20) and (21).

[Mathematical Formula 20]

$$y_i = f_i(M, L) = a_i \times \exp\left(\frac{L-1}{b_i}\right) \text{ \{if } L \leq Mi \tag{20}$$

[Mathematical Formula 21]

$$y_i = f_i(M_i, L) = \\ a_i \times \exp\left(\frac{M_i - 1}{b_i}\right) + r_i \times \left(a_i \times \exp\left(\frac{M_i - 1}{b_i}\right)\right) \times \frac{(L - M_i)}{M_i} \text{ \{if } L \geq M_i \tag{21}$$

In addition, "p, q, and r" in Expressions (1) and (2) are replaced with constants "$v_j$, $w_j$, and $r_j$" for each process "j" and the approximate equation of the "internal retention time" for each process is represented by the following Expressions (22) and (23).

[Mathematical Formula 22]

$$y_j = f_j(M_j, L) = v_j \times \exp\left(\frac{L-1}{w_j}\right) \text{ \{if } l \leq M_i \tag{22}$$

[Mathematical Formula 23]

$$y_j = f_j(M_j, L) = v_j \times \exp\left(\frac{M_i - 1}{w_j}\right) + \\ r_j \times \left(v_j \times \exp\left(\frac{M_j - 1}{w_j}\right)\right) \times \frac{(L - M_j)}{M_j} \text{ \{if } L \geq M_j \tag{23}$$

The average value 34c of the internal retention times of each number of internal retention requests for each process identifier, which satisfies L<M, is substituted into Expression (20) and regression analysis is performed to calculate the coefficients (preliminary coefficients) of Expression (20). The calculated preliminary coefficients are substituted into Expression (20) to calculate the preliminary approximate equation 34b of the internal retention times which satisfy L<M and are represented by arrows A23 to A30 in FIG. 16.

The average value 34c of the internal retention times of each number of internal retention requests for each process, which satisfies L<M, is substituted into Expression (22) and regression analysis is performed to calculate the coefficients (preliminary coefficients) of Expression (22). The calculated preliminary coefficients are substituted into Expression (22) to calculate the preliminary approximate equation 34b of the internal retention times which satisfy L<M and are represented by arrows A21 and A22 in FIG. 16.

When the information for regression analysis illustrated in FIG. 16 is extracted from the operation data of the data processing structure illustrated in FIG. 5, the denominators of exponential parts of the preliminary approximate equation 34b illustrated in FIG. 16 have substantially the same value.

For example, the denominators (a coefficient "$w_j$" in Expression (22)) of the exponential parts of the preliminary approximate equations 34b corresponding to the processes indicated by arrows A21 to A22 illustrated in FIG. 16 and the denominators (a coefficient "$b_i$" in Expression (20)) of the exponential parts of the preliminary approximate equations 34b corresponding to the process identifiers indicated by arrows A23 to A30 illustrated in FIG. 16 have substantially the same value.

The reason is as follows. In the data processing structure illustrated in FIG. 5, any process forming the web system 2 processes the request for the content of uniform processing and the gradient of the internal retention time "y" with respect to the number of internal retention requests "L" indicated by the denominator of the preliminary approximate equation illustrated in FIG. 16 is the same, as illustrated in FIG. 6.

The approximate equation of the "internal retention time" in the data processing structure illustrated in FIG. 5 is represented by Expression (20) and Expression (21). In the data processing structure illustrated in FIG. 5, the number of capacity control parameters is 1 in the entire web system 2.

When the information for regression analysis illustrated in FIG. 16 is extracted from the operation data of the data processing structure illustrated in FIG. 8, the denominators of the exponential parts of the preliminary approximate equation 34b illustrated in FIG. 16 have substantially the same value for the process identifiers in the same process.

For example, the denominators of the exponential parts of the preliminary approximate equations 34b represented by arrows A23 to A25, A27, and A28 illustrated in FIG. 16 are the denominators of the exponential parts of the preliminary approximate equations 34b for the process identifiers in the same process "WebAPSv01;8009" and have substantially the same value (in FIG. 16, the denominators of the exponential parts of the preliminary approximate equations 34b represented by the arrows A23 to A25, A27, and A28 do not have substantially the same value). In addition, the denominators of the exponential parts of the preliminary approximate equations 34b represented by arrows A26, A29, and A30 illustrated in FIG. 16 are the denominators of the exponential parts of the preliminary approximate equations 34b for the process identifiers in the same process "WebAPSv02;8008" and have substantially the same value (in FIG. 16, the denominators of the exponential parts of the preliminary approximate equations 34b represented by the arrows A26, A29, and A30 do not have substantially the same value). The reason is as follows. In the data processing structure illustrated in FIG. 8, the request for the content of uniform processing is processed in each process and the gradient of the internal retention time "y" with respect to the number of internal retention requests "L" indicated by the denominator of the preliminary approximate equation illustrated in FIG. 16 is the same, as illustrated in FIG. 6.

The approximate equation of the "internal retention time" in the data processing structure illustrated in FIG. 8 is represented by Expression (22) and Expression (23). In the data processing structure illustrated in FIG. 8, the number of capacity control parameters is equal to the number of types of processes. For example, in the example illustrated in FIG. 8, there are seven capacity control parameters.

When the information for regression analysis illustrated in FIG. 16 is extracted from the operation data of the data processing structures illustrated in FIGS. 9 and 10, the denominators of the exponential parts of the preliminary approximate equation 34b illustrated in FIG. 16 have different values for the process identifiers in the same process. For example, the denominators of the exponential parts of the preliminary approximate equations 34b represented by arrows A21 to A30 have different values. This is because the request for the content of non-uniform processing is input to each process in the data processing structures illustrated in FIGS. 9 and 10.

In the data processing structures illustrated in FIGS. 9 and 10, the approximate equation of the "internal retention time" is represented by the following Expressions (24) and (25).

[Mathematical Formula 24]

$$y_i = f_i(M, L) = a_i \times \exp\left(\frac{L-1}{b_i}\right) \text{ (if } L \leq Mi\text{)} \quad (24)$$

[Mathematical Formula 25]

$$y_i = f_i(M_i, L) = \\ a_i \times \exp\left(\frac{M_i - 1}{b_i}\right) + r_i \times \left(v_j \times \exp\left(\frac{M_i - 1}{w_j}\right)\right) \times \frac{(L - M_i)}{M_i} \text{ (if } L \geq M_i\text{)} \quad (25)$$

The Approximate Expressions (24) and (25) corresponding to the data processing structures illustrated in FIGS. 9 and 10 include a constant for each process identifier "i" and a constant for each process "j". This is because a processing request for each non-uniform processing identifier is input to the queue for each process. That is, this is because the internal retention time of the processing request corresponding to a given process identifier "i" depends on the internal retention time of the processing request by the other process identifiers in the data processing structures illustrated in FIGS. 9 and 10.

For example, a request for the content of non-uniform processing of process identifiers "a" and "b" is temporarily stored in the queue of a given process such that data processing is performed in order of the process identifiers "a" and "b". In this case, the internal retention time "$y_2$" of the processing request of the process identifier "b" depends on the internal retention time "$y_1$" of the processing request of the process identifier "a". Specifically, when the internal retention time of the process identifier "a" is short, data processing for the processing request of the process identifier "b" starts early and the internal retention time of the processing request of the process identifier "b" is short. When the internal retention time of the processing request of the process identifier "a" is long, the data processing start time of the processing request of the process identifier "b" is delayed and the internal retention time of the processing request of the process identifier "b" is long.

As such, in the data processing structures illustrated in FIGS. 9 and 10, the internal retention time also depends on the process identifiers other than its process identifier. Therefore, coefficients "$v_j$" and "$w_j$" for each process "j" which considers the average dependence of all process identifiers other than its process identifier are introduced into Expression (25) and a coefficient "$r_i$" for each process identifier "i" in Expression (25) which has a different value from a coefficient "$r_i$" for each process identifier "i" in Expression (21) is calculated such that Expression (24) and Expression (25) intersect each other at "L=M". That is, the coefficient "$r_i$" for each process identifier "i" in Expression (25) and the coefficients "$v_j$" and "$w_j$" for each process "j", to which the process identifier "i" belongs, interfere with the internal retention time of the process identifier at which the processing requests of the other process identifiers are calculated.

Then, the coefficient calculation unit 23 calculates the coefficients of the approximate equation corresponding to the data processing structure of the web system 2, on the basis of the preliminary coefficients calculated in step S25. Then, the parameter calculation unit 24 calculates the capacity control parameters from the calculated coefficients (step S26).

Then, the transmitting unit 25 transmits the new capacity control parameters calculated by the parameter calculation unit 24 to the web system 2 (step S27).

Figure 18:
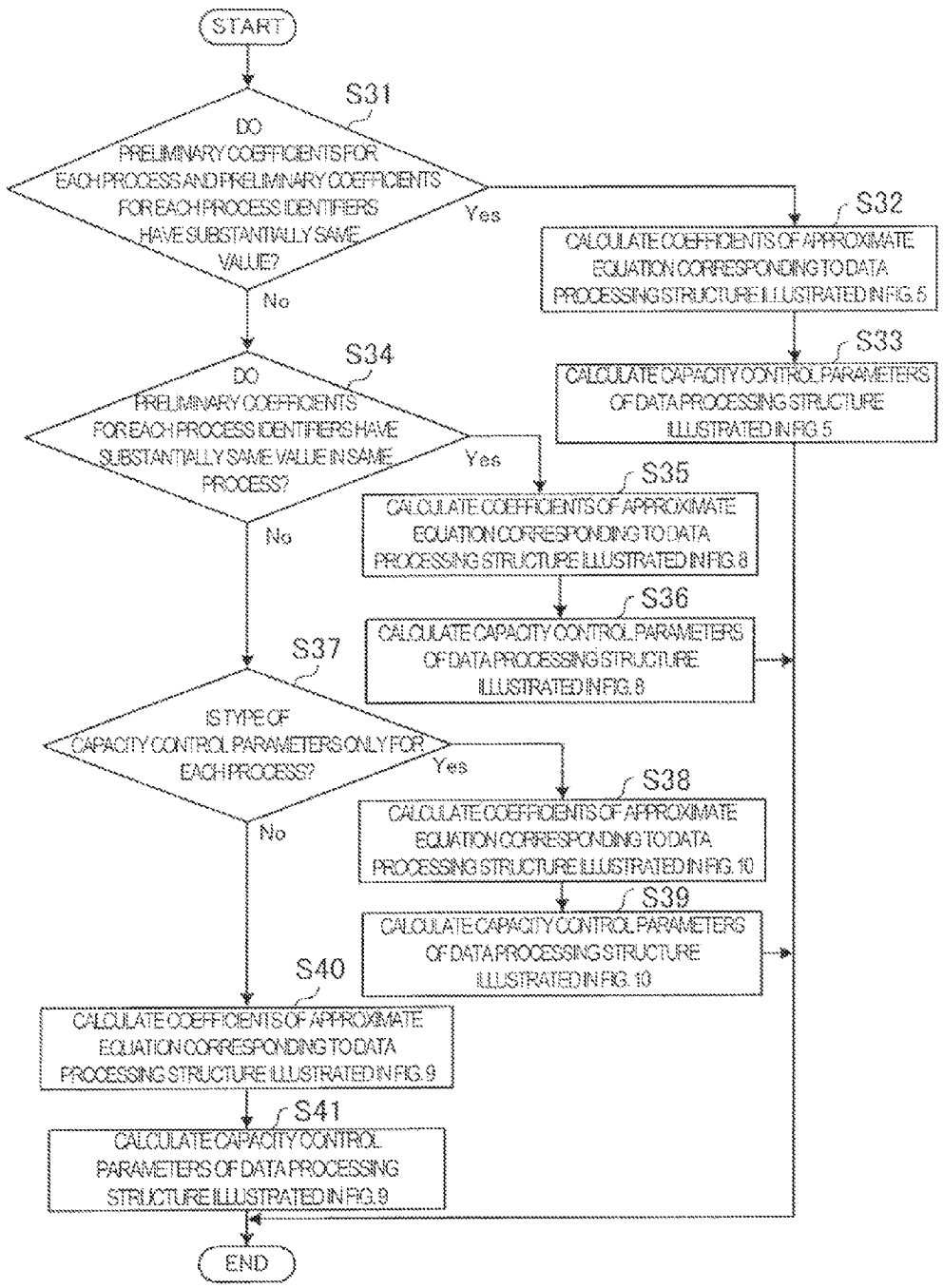
FIG. 18 is a flowchart illustrating an example of the operation of a coefficient calculation unit 23 and a parameter calculation unit 24.

FIG. 18 is a flowchart illustrating an example of the operation of the coefficient calculation unit 23 and the parameter calculation unit 24. The flowchart of FIG. 18 illustrates the detailed example of the operation in step S26 illustrated in FIG. 17.

First, the coefficient calculation unit 23 determines whether the coefficients (the denominators of the exponential parts) of the preliminary approximate equations 34b in each process and the coefficients (the denominators of the exponential parts) of the preliminary approximate equations 34b in each process identifier have substantially the same value (step S31). For example, the coefficient calculation unit 23 determines whether values obtained by rounding the denominators of the exponential parts of the preliminary approximate equations 34b indicated by the arrows A21 to A30 in FIG. 16 to the nearest integers are substantially equal to each other. When it is determined that the coefficients of the preliminary approximate equations 34b in each process and the coefficients of the preliminary approximate equations 34b in each process identifier have substantially the same value, the coefficient calculation unit 23 proceeds to step S32. When it is determined that the coefficients of the preliminary approximate equations 34b in each process and the coefficients of the preliminary approximate equations 34b in each process identifier do not have substantially the same value, the coefficient calculation unit 23 proceeds to step S34. It is determined whether a plurality of values are substantially closed (equal to each other), on the basis of the condition which is given as one of the tuning policy parameters or a customizable logic. For example, the average value of a plurality of values is calculated and it is determined that the plurality of values are substantially equal to each other when the difference between each of the plurality of values and the average value is in a predetermined range.

When it is determined in step S31 that the coefficients of the preliminary approximate equations 34b for each process and the coefficients of the preliminary approximate equations 34b for each process identifier have substantially the same value ("Yes" in step S31), the coefficient calculation unit 23 calculates the coefficient "$a_i$" and "$b_i$" of Approximate Expression (20) corresponding to the data processing structure illustrated in FIG. 5, using regression analysis (step S32). This is because the coefficients of the preliminary approximate equations 34b for each process identifier and the coefficients of the preliminary approximate equations 34b for each process have substantially the same value in the data processing structure illustrated in FIG. 5. The coefficients "$a_i$" and "$b_i$" are calculated in the stage in which the coefficients of the preliminary approximate equations 34b indicated by the arrows A23 to A30 illustrated in FIG. 16 are calculated.

Then, the parameter calculation unit 24 calculates a new capacity control parameter corresponding to the data processing structure illustrated in FIG. 5, using the coefficients calculated in step S32 (step S33). For example, the parameter calculation unit 24 calculates the maximum number of simultaneous executions "M" (M=max (celing($b_i$))) of the new capacity control parameter. As described above, when the type of processing requested in the web system 2 is uniform, "r" in Expression (17) becomes "r=1". When "r=1" is established, Expression (17) is "0" on condition that q is equal to M. Therefore, the maximum number of simultaneous executions "M" in the data processing structure illustrated in FIG. 5 can be calculated as M=max(celing($b_i$)).

The parameter calculation unit 24 substitutes the maximum number of simultaneous executions "M" calculated in step S33 into Expression (21) and calculates the number of internal retention requests "L" that does not exceed the internal retention time "$y_{Limit}$", which is input as one of the tuning policy parameters in step S21 of FIG. 17 and is allowed in the Web system 2, using a simulation.

For example, in step S33, as illustrated in the graph of FIG. 22, the parameter calculation unit 24 substitutes some values of "L" into Expression (21) and calculates the number of internal retention requests "$L_{Limit}$" that does not exceed the internal retention time"$Y_{Limit}$". Then, the parameter calculation unit 24 calculates the maximum queue length (QueueSize) using ($L_{Limit}$–M). When the value of ($L_{Limit}$–M) is equal to or less than 0, the maximum queue length (QueueSize) is 0 and the maximum number of simultaneous executions "M" is replaced with the value of "$L_{Limit}$" again.

In step S33, the capacity control parameters "M and QueueSize" illustrated in FIG. 5 are calculated. In the data processing structure illustrated in FIG. 5, one type of capacity control parameter is reflected in the entire web system 2.

When it is determined in step S31 that the coefficients of the preliminary approximate equations 34b for each process and the coefficients of the preliminary approximate equations 34b for each process identifier do not have substantially the same value ("No" in step S31), the coefficient calculation unit 23 determines whether the preliminary coefficients for each process identifier have the same value in the same process (step S34). For example, the coefficient calculation unit 23 determines whether values, which are obtained by rounding the denominators of the exponential parts of the preliminary approximate equations 34b indicated by the arrows A23 to A30 in FIG. 16 to the nearest integers, have substantially the same value in the same process. Specifically, the coefficient calculation unit 23 determines whether values, which are obtained by rounding the denominators of the exponential parts of the preliminary approximate equations 34b indicated by the arrows A23 to A25, A27, and A28 in FIG. 16 in the process "WebAPSv01;8009" to the nearest integers, have substantially the same value according to a similarity determination condition for each process identifier which is given as one of the tuning policy parameters. In addition, the coefficient calculation unit 23 determines whether values, which are obtained by rounding the denominators of the exponential parts of the preliminary approximate equations 34b indicated by the arrows A26, A29, and A30 in FIG. 16 in the process "WebAPSv02;8008" to the nearest integers, have substantially the same value. When it is determined that the coefficients of the preliminary approximate equations 34b for each process identifier have substantially the same value in the same process, the coefficient calculation unit 23 proceeds to step S35. When it is determined that the coefficients of the preliminary approximate equations 34b for each process identifier do not have substantially the same value in the same process, the coefficient calculation unit 23 proceeds to step S37.

When it is determined in step S34 that the coefficients "$b_i$" of the preliminary approximate equations 34b for each process identifier "i" have substantially the same value in the same process "j" to which the process identifiers "i" belong ("Yes" in step S34), the coefficient calculation unit 23 calculates the coefficients in Approximate Expression (22) and Approximate Expression (23) corresponding to the data processing structure illustrated in FIG. 5 in step S35.

When "L<M" is satisfied, that is, when the number of internal retention requests "L" is less than the maximum number of simultaneous executions "M" during the acquisition of the operation data, coefficients "$v_j$" and "$w_j$" are calculated in the stage in which the coefficients of the preliminary approximate equations 34b indicated by the arrows A21 and A22 in FIG. 16 are calculated since Approximate Expression (22) has the same form as Preliminary Approximate Expression (1) used in step S25.

Therefore, the coefficient "p" of the constant term in the preliminary approximate equation 34b and the coefficient "q" of the denominator of the exponential part in the preliminary approximate equation 34b are respectively selected as the coefficients "$v_j$" and "$w_j$" in Approximate Expression (22) which are calculated in the stage in which the coefficients of the preliminary approximate equations 34b indicated by the arrows A21 and A22 in FIG. 16 are calculated.

Then, regression analysis is performed, using Expression (15) when "L≥M" is satisfied, the amount of load (the number of internal retention requests) "$L_k$" that is greater than the maximum number of simultaneous executions "M" currently set in the web system 2, and an internal retention time "$y_k$" at the amount of load (the number of internal retention requests) "$L_k$" among the amounts of load (the numbers of internal retention requests) and the internal retention times extracted from the operation data, to calculate a coefficient δ. Then, a linear equation indicated by Expression (16) which is established on condition that Expression (22) and Expression (23) intersect each other at "L=M" is solved to calculate a coefficient "$r_j$".

Then, the parameter calculation unit 24 substitutes the coefficients calculated up to step S35 into Expression (23) to calculate a new capacity control parameter corresponding to the data processing structure illustrated in FIG. 8 (Step s36).

For example, the parameter calculation unit 24 substitutes the coefficients "$v_j$ and $w_j$" calculated in step S25, the coefficient "r" calculated in step S35, and the assumed amount of load "L" which is input as one of the tuning policy parameters in step S21 of FIG. 17 into Expression (23), substitutes some values of "M" into Expression (23) as illustrated in the graph G12 of FIG. 4, and selects the value of "M" at which the internal retention time "y" is the minimum as the improved value of the maximum number of simultaneous executions "$M_j$".

The parameter calculation unit 24 fixes the value of "M" in Expression (23) to the maximum number of simultaneous executions "$M_j$" calculated in step S36 and calculates the number of internal retention requests "$L_j$" that does not exceed the internal retention time"$y_{Limit}$", which is allowed in the process "j" and is input as one of the tuning policy parameters in step S21 of FIG. 17, using a simulation.

For example, in step S36, as illustrated in the graph of FIG. 22, the parameter calculation unit 24 substitutes some values of "L" into Expression (23) to calculate the number of internal retention requests "$L_j$" that does not exceed the internal retention time "$y_{Limit}$". Then, the parameter calculation unit 24 calculates the maximum queue length (QueueSize$_j$) using ($L_j-M_j$). When the value of ($L_j-M_j$) is equal to or less than 0, the maximum queue length (QueueSize$_j$) is 0 and the maximum number of simultaneous executions "$M_j$" is replaced with the value of "$L_j$" again.

In step S36, the capacity control parameters "$M_j$ and QueueSize$_j$" for each process "j" illustrated in FIG. 8 are calculated. In the data processing structure illustrated in FIG. 8, the capacity control parameters which are different in each process are reflected in the web system 2.

When it is determined in step S34 that the coefficients of the preliminary approximate equations 34b for each process identifier do not have substantially the same value in the same process ("No" in step S34), the coefficient calculation unit 23 determines whether the types of the capacity control parameters of the web system 2 received in step S22 of FIG. 17 are present only for each process (step S37).

Here, the determination of the coefficient calculation unit 23 in step S34 that the coefficients of the preliminary approximate equations 34b for each process identifier do not have substantially the same value in the same process means that a request for the content of non-uniform processing is input to the process (queue) in the data processing structure of the web system 2. That is, the web system 2 has the data processing structure illustrated in FIG. 9 or FIG. 10.

The coefficient calculation unit 23 determines whether the types of the capacity control parameters of the web system 2 received in step S22 of FIG. 17 are present only for each process to determine whether the web system 2 has the data processing structure illustrated in FIG. 9 or the data processing structure illustrated in FIG. 10. When it is determined that the types of capacity control parameters of the web system 2 received in step S22 of FIG. 17 are present only for each process, the coefficient calculation unit 23 proceeds to step S38. When it is determined that the types of the capacity control parameters of the web system 2 received in step S22 of FIG. 17 are not present only for each process, the coefficient calculation unit 23 proceeds to step S40.

In the data processing structure illustrated in FIG. 9, the capacity control parameters are present for each type of process and the capacity control parameters are present for each type of process identifier. For example, in FIG. 9, there are the following capacity control parameters: a capacity control parameter (one capacity control parameter) for the entire dotted frame D1 (process P1); and capacity control parameters (two capacity control parameters) for each of the processing requests (process identifiers) a and b. In addition, there are the following capacity control parameters: a capacity control parameter (one capacity control parameter) for the entire dotted frame D2 (process P2); and capacity control parameters (two capacity control parameters) for each of the processing requests (process identifiers) c and d. Furthermore, there are the following capacity control parameters: a capacity control parameter (one capacity control parameter) for the entire dotted frame D3 (process P3); and capacity control parameters (three capacity control parameters) for each of the processing requests (process identifiers) e, f, and g. That is, in FIG. 9, there are a total of ten capacity control parameters.

In the data processing structure illustrated in FIG. 10, the capacity control parameters are present for each type of process. For example, in FIG. 10, there are the following capacity control parameters: a capacity control parameter (one capacity control parameter) for the dotted frame D1 (process P1); a capacity control parameter (one capacity control parameter) for the dotted frame D2 (process P2); and a capacity control parameter (one capacity control parameter) for the dotted frames D3a and D3b (process P3). That is, in FIG. 10, there are a total of three capacity control parameters.

When it determined in step S37 that the types of the capacity control parameters of the web system 2 are present only for each process ("Yes" in step S37), the coefficient calculation unit 23 calculates the coefficients "$a_i$" and "$b_i$" of Approximate Expression (24) corresponding to the data processing structure illustrated in FIG. 10, the coefficients "$v_j$" and "$w_j$" of Approximate Expression (25) for each process "j" to which the process identifier "i" belongs, and the coefficient "$r_i$" for each process identifier "i" in step S38.

However, when "L<M" is satisfied, that is, when the number of internal retention requests "L" is less than the maximum number of simultaneous executions "M" during the acquisition of the operation data, the coefficients "$a_i$" and "$b_i$" for each process identifier "i" are calculated in the stage in which the coefficients of the preliminary approximate equations 34b indicated by the arrows A23 to A30 illustrated in FIG. 16 are calculated since Approximate Expression (24) has the same form as Preliminary Approximate Expression (1) used in step S25. Similarly, the coefficients "$v_j$" and "$w_j$" for each process "j" to which the process identifier "i" belongs are calculated in the stage in which the coefficients of the preliminary approximate equations 34b indicated by the arrows A21 and A22 illustrated in FIG. 16 are calculated.

Then, regression analysis is performed, using Expression (15) when "L≥M" is satisfied, the amount of load (the number of internal retention requests) "$L_k$" greater than the maximum number of simultaneous executions "M" which is set for each process identifier "i" during the acquisition of the operation data, and the internal retention time "$y_k$" at the amount of load (the number of internal retention requests) "$L_k$" among the amounts of load (the numbers of internal retention requests) and the internal retention times extracted from the operation data, to calculate the coefficient δ. Then, the linear equation indicated by Expression (16) which is established on condition that Expression (24) and Expression (25) intersect each other at "L=M" is solved to calculate a coefficient "$r_i$."

Then, the parameter calculation unit 24 substitutes the coefficients calculated up to step S38 into Expression (25) to calculate new capacity control parameters corresponding to the data processing structure illustrated in FIG. 10 (step S39).

For example, in the parameter calculation unit 24, the coefficients "$a_i$, $b_i$, $v_j$, and $w_j$" calculated in step S25, the coefficient "$r_i$" calculated in step S38, and the assumed amount of load "L" which is input as one of the tuning policy parameters are substituted into Expression (25). In addition, some values of "M" are substituted into Expression (25) as illustrated in the graph G12 of FIG. 4 and the value of "M" at which the internal retention time "y" is the minimum is selected as the improved value of the maximum number of simultaneous executions "$M_j$".

The parameter calculation unit 24 fixes the value of "M" in Expression (23) to the maximum number of simultaneous executions "$M_i$" calculated in step S39 and calculates the number of internal retention requests "$L_i$" that does not exceed the internal retention time "$y_{Limit}$", which is allowed in the process "j" including the process identifier "i" that is input as one of the tuning policy parameters in step S21 of FIG. 17, using a simulation.

For example, in step S39, as illustrated in the graph of FIG. 22, the parameter calculation unit 24 substitutes some values of "L" into Expression (23) to calculate the number of internal retention requests "$L_i$" that does not exceed the internal retention time "$y_{Limit}$". Then, the parameter calculation unit 24 calculates the maximum queue length (QueueSize$_i$) using ($L_i-M_i$). When the value of ($L_i-M_i$) is equal to or less than 0, the maximum queue length (QueueSize$_i$) is 0 and the maximum number of simultaneous executions "$M_i$" is replaced with the value of "$L_i$" again.

Then, the parameter calculation unit 24 (step S41) calculates the weighted average of the maximum numbers of simultaneous executions "$M_i$" for the process identifiers "i" belonging to the process "j" and uses the calculated weighted average as the maximum number of simultaneous executions "$M_j$" in the process "j". In addition, the parameter calculation unit 24 calculates the weighted average of the maximum queue lengths (QueueSize$_i$) for the process identifiers "i" belonging to the process "j" and uses the calculated weighted average as the maximum queue length (QueueSize$_j$) in the process "j".

Here, a "weighted coefficient for the improved value for each process identifier" may be directly or indirectly input as one of the tuning policy parameters or it may be incorporated as a customizable logic in the processing apparatus to simplify an input operation.

In the data processing structure illustrated in FIG. 10, only the maximum number of simultaneous executions "$M_j$" and the maximum queue length (QueueSize$_j$) which are the capacity control parameters for each process "j" are reflected in the web system 2 and the capacity control parameters for each process identifier "i" are not reflected in the web system 2.

When it determined in step S37 that the types of the capacity control parameters of the web system 2 are present only for each process ("Yes" in step S37), the coefficient calculation unit 23 calculates the coefficients "$a_i$" and "$b_i$" of Approximate Expression (24) corresponding to the data processing structure illustrated in FIG. 9, the coefficients and "$v_j$" and "$w_j$" of Approximate Expression (25) for each process "j" to which the process identifier "i" belongs, and the coefficient "$r_i$" for each process identifier "i" in step S40.

However, when "L<M" is satisfied, that is, when the number of internal retention requests "L" is less than the maximum number of simultaneous executions "M" during the acquisition of the operation data, the coefficients "$a_i$" and "$b_i$" for each process identifier "i" are calculated in the stage in which the coefficients of the preliminary approximate equations 34b indicated by the arrows A23 to A30 illustrated in FIG. 16 are calculated since Approximate Expression (24) has the same form as Preliminary Approximate Expression (1) used in step S25. Similarly, the coefficients "$v_j$" and "$w_j$" for each process "j" to which the process identifier "i" belongs are calculated in the stage in which the coefficients of the preliminary approximate equations 34b indicated by the arrows A21 and A22 illustrated in FIG. 16 are calculated.

Then, regression analysis is performed, using Expression (15) when "L≧M" is satisfied, the amount of load (the number of internal retention requests) "$L_k$" greater than the maximum number of simultaneous executions "M" which is set for each process identifier "i" during the acquisition of the operation data, and the internal retention time "$y_k$" at the amount of load (the number of internal retention requests) "$L_k$" among the amounts of load (the numbers of internal retention requests) and the internal retention times extracted from the operation data, to calculate the coefficient δ. Then, the linear equation indicated by Expression (16) which is established on condition that Expression (24) and Expression (25) intersect each other at "L=M" is solved to calculate the coefficient "$r_i$".

Then, the parameter calculation unit 24 substitutes the coefficients calculated up to step S40 into Expression (25) to calculate new capacity control parameters corresponding to the data processing structure illustrated in FIG. 9 (step S41).

For example, the parameter calculation unit 24 substitutes, into Expression (25), the coefficients "$a_i$, $b_i$, $v_j$, and $w_j$" calculated in step S25, the coefficient "$r_i$" calculated in step S40, and the assumed amount of load "L" which is input as one of the tuning policy parameters in step S21 of FIG. 17, substitutes some values of "M" into Expression (25) as illustrated in the graph G12 of FIG. 4, and selects the value of "M" at which the internal retention time "y" is the minimum as the improved value of the maximum number of simultaneous executions "$M_i$".

The parameter calculation unit 24 fixes the value of "M" in Expression (25) to the maximum number of simultaneous executions "$M_i$" calculated in step S41 and calculates the number of internal retention requests "$L_i$" that does not exceed the internal retention time "$y_{Limit}$", which is allowed in the process identifier "i" that is input as one of the tuning policy parameters in step S21 of FIG. 17, using a simulation.

For example, in step S41, as illustrated in the graph of FIG. 22, the parameter calculation unit 24 substitutes some values of "L" into Expression (23) to calculate the number of internal retention requests "$L_i$" that does not exceed the internal retention time "$y_{Limit}$". Then, the parameter calculation unit 24 calculates the maximum queue length (QueueSize$_i$) using ($L_i-M_i$). When the value of ($L_i-M_i$) is equal to or less than 0, the maximum queue length (QueueSize$_i$) is 0 and the maximum number of simultaneous executions "$M_i$" is replaced with the value of "$L_i$" again.

Then, the parameter calculation unit 24 uses the maximum value of the maximum number of simultaneous executions "$M_i$" for each process identifier "i" belonging to the process "j" as the maximum number of simultaneous executions "$M_j$" in the process "j". In addition, the parameter calculation unit 24 uses the maximum value of the maximum queue length (QueueSize$_i$) in the process identifier "i" belonging to the process "j" as the maximum queue length (QueueSize$_j$) in the process "j".

In this way, in the data processing structure illustrated in FIG. 9, the capacity control parameters "$M_i$ and QueueSize$_i$" for each type of process identifier "i" and the capacity control parameters "$M_j$ and QueueSize$_j$" for each type of process "j" are calculated.

In the data processing structure illustrated in FIG. 9, both the maximum number of simultaneous executions "$M_j$" and the maximum queue length, which are capacity control parameters for each process "j", and the capacity control parameters for each process identifier "i" are reflected in the web system 2.

The process of calculating the capacity control parameters for the data processing structure illustrated in FIG. 9 and the process of calculating the capacity control parameters for the data processing structure illustrated in FIG. 10 are the same in the approximate equations applied and the calculation of the capacity control parameters for each process identifier and are different from each other in that a weighted value for calculating the capacity control parameters for each process from the capacity control parameters for each process identifier is fixed to the maximum value.

It is possible to calculate the capacity control parameters corresponding to the data processing structure of the web system 2, using the operation illustrated in the flowchart of FIG. 18.

In the data processing structure illustrated in FIG. 10, the weighted average of the capacity control parameters is calculated according to the condition which is given as one of the tuning policy parameters. However, for example, there are the following methods as the weighted average method. For example, the incidence ratio of the processing request of the process identifier "i" is used as a weighted parameter. Alternatively, the ratio of the total processing times of each process identifier "i" is used as the weighted parameter. Alternatively, in the assumed number of internal retention requests "L", "1" is set to a weighted parameter for the latest process identifier "i" and "0" is set to a weighted parameter for the other process identifiers. Alternatively, "1" is set to a weighted parameter for the process identifier "i" having the largest sum of the internal retention times in the operation data and "0" is set to a weighted parameter for the other process identifiers. Alternatively, "1" is set to a weighted parameter for the minimum value of the new candidate values "$M_i$" of the maximum number of simultaneous executions for the process identifier "i" and "0" is set to a weighted parameter for the other process identifiers. Alternatively, "1" is set to a weighted parameter for the maximum value of the new candidate values "$M_i$" of the maximum number of simultaneous executions for the process identifier "i" and "0" is set to a weighted parameter for the other process identifiers. Alternatively, the median of the new candidate values "$M_i$" of the maximum number of simultaneous executions is used as the new value of the maximum number of simultaneous executions. Alternatively, "1" is set to a weighted parameter for the new candidate values "$M_i$" of the maximum number of simultaneous executions for the designated process identifier "i" and "0" is set to a weighted parameter for the other process identifiers.

In the above-mentioned flowcharts, for ease of understanding of the process of the information processing apparatus 1, the unit of each process is divided according to the content of the main process. The present invention is not limited by a method for dividing the unit of process or the name thereof. The process of the information processing apparatus 1 may be divided into many units of process according to the content of the process. In addition, one unit of process may be divided so as to include many processes.

Figure 19:
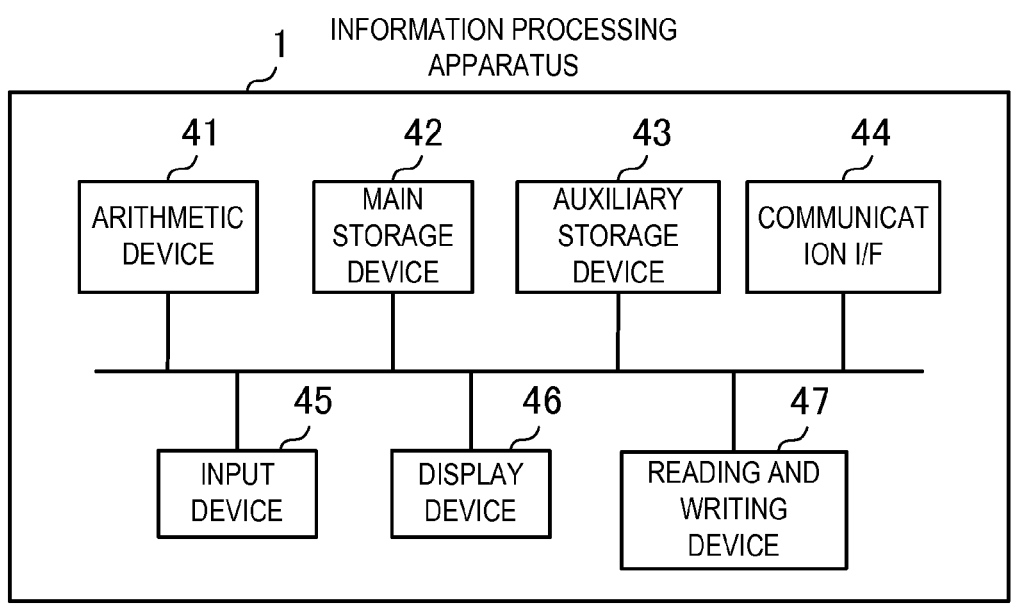
FIG. 19 is a diagram illustrating an example of the hardware configuration for implementing the functions of the information processing apparatus 1.

FIG. 19 is a diagram illustrating an example of the hardware configuration for implementing the functions of the information processing apparatus 1. The information processing apparatus 1 includes, for example, an arithmetic device 41, such as a CPU, a main storage device 42, such as a random access memory (RAM), an auxiliary storage device 43, such as a hard disk drive (HDD), a communication interface (I/F) 44 for wireless or wired connection to a communication network, an input device 45, such as a mouse, a keyboard, a touch sensor, or a touch panel, a display device 46, such as a liquid crystal display, and a reading and writing device 47 which reads and writes information from and to a portable storage medium, such as a digital versatile disk (DVD), which are illustrated in FIG. 19.

For example, the arithmetic device 41 executes a predetermined program which is loaded from, for example, the auxiliary storage device 43 to the main storage device 42 to implement the functions of the extraction unit 22, the coefficient calculation unit 23, and the parameter calculation unit 24 of the information processing apparatus 1. For example, the arithmetic device 41 uses the main storage device 42 or the auxiliary storage device 43 to implement the storage unit 26. The arithmetic device 41 uses the communication I/F 64 to implement the receiving unit 21 and the transmitting unit 25.

The above-mentioned predetermined program may be read from the storage medium by the reading and writing device 47 and then installed or it may be installed from the network through the communication I/F 44.

Some or all of the functions of the extraction unit 22, the coefficient calculation unit 23, and the parameter calculation unit 24 may be implemented by, for example, a controller board provided with an application specific integrated circuit (ASIC) including an arithmetic device, a storage device, and a driving circuit.

The functional structure of the information processing apparatus 1 is classified according to the content of the main process for ease of understanding of the structure of the information processing apparatus 1. The present invention is not limited by a method for classifying components or the names of the components. The structure of the information processing apparatus 1 may be classified into many components according to the content of the process. In addition, one component may be classified so as to perform a plurality of processes. The process of each component may be performed by one hardware component or a plurality of hardware components.

As such, the information processing apparatus 1 calculates, from the operation data of the web system 2, the preliminary coefficients of the approximate equation when the number of internal retention requests "L" is less than the maximum number of simultaneous executions "M" and selects the approximate equation corresponding to the data processing structure of the web system 2 on the basis of the calculated preliminary coefficients. Then, the information processing apparatus 1 calculates the coefficients of the selected approximate equation and calculates the new capacity control parameters of the web system 2 from the approximate equation whose coefficients have been calculated. Therefore, it is possible to calculate appropriate capacity control parameters corresponding to the data processing structure of the web system 2.

The information processing apparatus 1 calculates the new capacity control parameters of the web system 2 from the operation data of the web system 2. That is, the information processing apparatus 1 calculates the new capacity control parameters of the web system 2 from the operation data of the web system 2 which does not include data (for example, steps S1 to S4 and steps S9 to S11 in FIG. 2) that does not depend between the terminal apparatus 3 and the Web system 2. Therefore, the information processing apparatus 1 can calculate high-accuracy capacity control parameters corresponding to the data processing structure of the web system 2.

Figure 20:
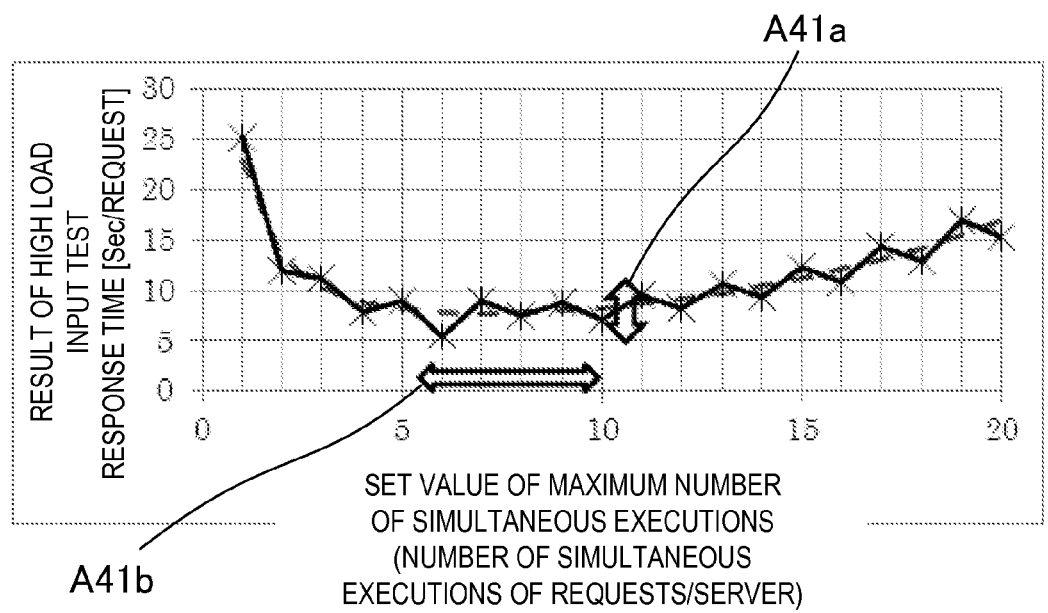
FIG. 20 is a diagram illustrating the relationship between the maximum number of simultaneous executions and the response time of the web system 2 when a load is applied from a terminal apparatus 3 to the web system 2.

FIG. 20 is a diagram illustrating the relationship between the maximum number of simultaneous executions and the response time when a load is applied from the terminal apparatus 3 to the web system 2. In FIG. 20, a graph represented by a solid line indicates the relationship between the maximum number of simultaneous executions and the response time in the web system 2 when the terminal apparatus 3 applies a load and measures the response time of the process. In FIG. 20, a graph represented by a dotted line indicates the relationship between the maximum number of simultaneous executions and the response time in the web system 2 when a load is directly applied to the web system 2 and the web system 2 measures the response time of the process.

When the terminal apparatus 3 applies a load to the web system 2, measures the response time, and calculates the maximum number of simultaneous executions most suitable for the web system 2, there is a concern that an error will be included as represented by arrows A41a and 41b. This is because a response time error due to the terminal apparatus 3 or the network 4 other than the web system 2 is included.

In contrast, as described above, the information processing apparatus 1 according to the present invention calculates the new capacity control parameters of the web system 2 from the start time and the end time of the internal processing which is controlled by the capacity control parameters in the operation data of the web system 2. Therefore, it is possible to calculate high-accuracy capacity control parameters with a small error.

As described above, the information processing apparatus 1 calculates the coefficients of the approximate equation corresponding to the data processing structure of the web system 2 from the operation data of the web system 2, simulates the internal retention time after the capacity control parameters are changed, and uses the capacity control parameters for reducing the internal retention time. Therefore, it is not necessary to repeatedly perform the load input test requiring the input of a large amount of data to compare the response time and it is possible to easily calculate the capacity control parameters.

Moreover, even in expert analysis, it is difficult to calculate the capacity control parameters.

Figure 21:
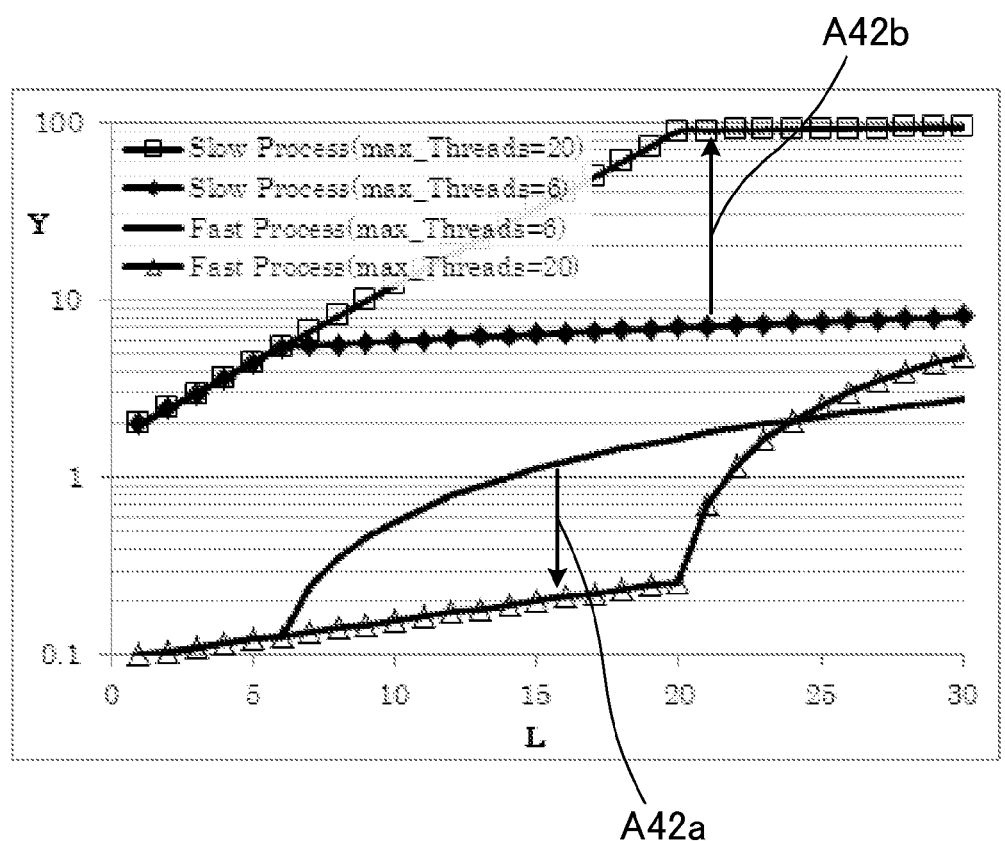
FIG. 21 is a diagram illustrating an example of the tuning of capacity control parameters.

FIG. 21 is a diagram illustrating an example of the tuning of the capacity control parameters. FIG. 21 illustrates the relationship between the internal retention times of a slow process and a fast process with respect to the amount of load.

It is assumed that "6" is set as the maximum number of simultaneous executions in the web system in which the process controlled by one capacity control parameter includes a fast process and a slow process. In this case, it is assumed that the maximum number of simultaneous executions is changed from "6" to "20" in order to reduce the internal retention time of the short process. In this case, the internal retention time of the fast process is reduced as illustrated in arrow A42a and the internal retention time of the slow process increases as illustrated in arrow A42b. That is, in some cases, the turning of the capacity control parameters has a trade-off relationship and it is difficult to calculate the capacity control parameters. In particular, the data processing structure illustrated in FIG. 9 requires many load input tests and high-accuracy expert analysis and it is difficult to calculate the capacity control parameters. In contrast, according to the information processing apparatus 1, it is possible to easily calculate high-accuracy capacity control parameters.

Only a single-stage M/M/C model is insufficient to estimate the processing time of the processing request input to the processing window. That is, in the single-stage M/M/C model, an internal retention time expression f (M, L) for the number of internal retention requests "L" and the maximum number of simultaneous executions "M" is used to obtain only the gradient of a portion in which the number of internal retention requests "L" is greater than the maximum number of simultaneous executions "M" and it is difficult to calculate the internal retention time when L<M is satisfied.

FIG. 22 is a diagram illustrating the calculation of the maximum queue length with an allowable waiting time. FIG. 22 illustrates an example of the relationship between the number of internal retention requests and the internal retention time when the maximum number of simultaneous executions is "10". As can be seen from FIG. 22, for example, when the internal retention time allowed in the web system is "8 seconds", it is difficult to set the maximum number of simultaneous executions to "9" and to set the maximum queue length to "0". In contrast, in the information processing apparatus 1, it is possible to calculate the capacity control parameters even when there is an inflection point at the maximum number of simultaneous executions.

The present invention has been described above using the embodiment and the technical scope of the present invention is not limited to the above-described embodiment. It will become apparent to those skilled in the art that various modifications and changes of the above-described embodiment can be made. The modifications or changes can also be included in the technical scope of the present invention and will be apparent from the claims.

For example, when the incidence ratio of the internal retention requests is low, the average value of the internal retention times of the internal retention requests may be used in the calculation of the preliminary approximate equation. For example, when the incidence ratio of the number of internal retention requests "8" hatched in FIG. 16 is less than a threshold value which is given as one of the tuning policy parameters, the coefficient calculation unit 23 calculates the preliminary approximate equation represented by the arrow A27, without using the hatched average value as data for regression analysis.

The coefficient calculation unit 23 may not calculate the preliminary approximate equation for a few number of internal retention requests. For example, there are only five types of internal retention requests is shown in the shaded 5 cell of FIG. 16. In this case, the coefficient calculation unit 23 may not calculate the preliminary approximate equation in the row represented by the arrow A28, using data in which the number of types of internal retention requests is less than a threshold value that is given as one of the tuning policy parameters.

When the average value of the internal retention times for the number of internal retention requests is beyond the range of the value which is expected from the average value of the internal retention times of adjacent internal retention requests, the preliminary approximate equation may be calculated except for the average value. The exclusion condition may also be given as one of tuning policy parameters.

Figure 23:
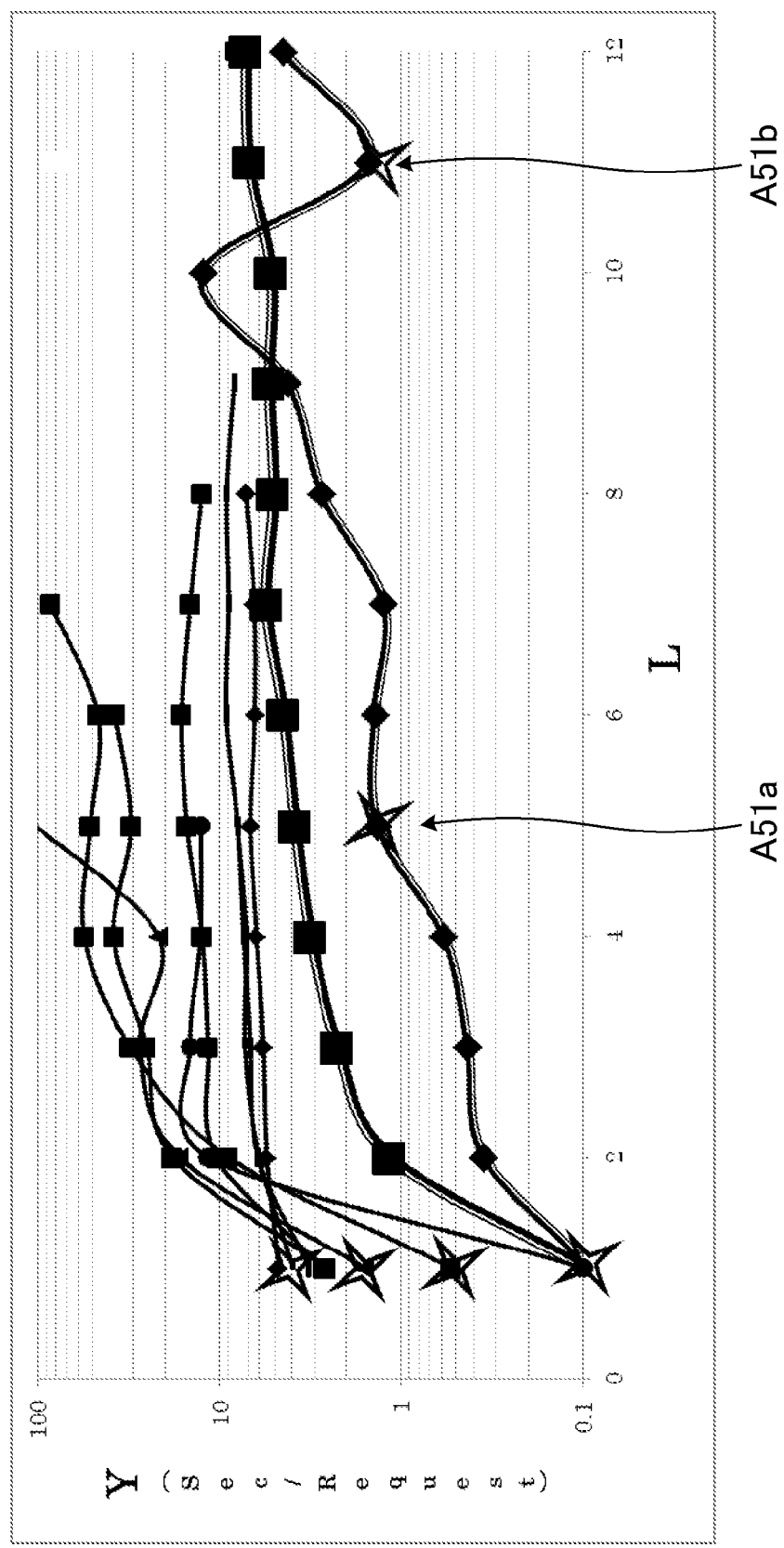
FIG. 23 is a graph illustrating the average value of the internal retention times for the number of internal retention requests.

FIG. 23 is a graph illustrating the average value of the internal retention times for the number of internal retention requests. When the average value of the internal retention times for the number of internal retention requests is graphed, for example, the graph illustrated in FIG. 23 is obtained.

In FIG. 23, arrows A51a and A51b which respectively indicate the numbers of internal retention requests "5" and "11" deviate from a curve connecting the average values. That is, it is considered that the average value for the numbers of internal retention requests "5" and "11" indicated by the arrows A51a and A51b deviates from the estimated value. In this case, the coefficient calculation unit 23 may calculate the preliminary approximate equation except for the average value for the numbers of internal retention requests "5" and "11" indicated by the arrows A51a and 51b.

In FIG. 23, there is an inflection point at the number of internal retention requests "2". As such, when there is an inflection point at the average value for the number of internal retention requests, the coefficient calculation unit 23 may calculate a preliminary approximate equation again, using the number of internal retention requests at the inflection point as the lower limit in the calculation of the preliminary approximate equation. For example, the coefficient calculation unit 23 calculates the preliminary approximate equation using the average value for the number of internal retention requests "2" or more (calculates the preliminary approximate equation except for the average value for the number of internal retention requests "1" in FIG. 23).

In the above-described embodiment, the receiving unit 21 receives the operation data from the web system 2. However, for example, the operation data of the web system 2 may be stored in a storage medium, such as a CD-ROM, and the receiving unit 21 may receive the operation data stored in the storage medium from the reading and writing device 47.

In the above-described embodiment, the receiving unit 21 receives the capacity control parameters which are currently set in the web system 2 from the web system 2. However, the receiving unit 21 may receive the capacity control parameters which are currently set in the web system 2 from the administrator of the web system 2.

In the above-described embodiment, the transmitting unit 25 transmits the newly calculated capacity control parameters to the web system 2. However, for example, the newly calculated capacity control parameters may be displayed on the terminal apparatus. Then, the administrator of the web system 2 may set the capacity control parameters displayed on the display to the web system 2.

The information processing apparatus 1 receives the operation data and the capacity control parameters which are currently set in the web system 2 from the web system 2. However, the administrator of the web system 2 may input the operation data and the capacity control parameters to the information processing apparatus 1. For example, the administrator of the web system 2 may store the operation data of the web system 2 in a storage medium, such as a CD-ROM, and instruct the information processing apparatus 1 to read the operation data from the CD-ROM.

In the above-described embodiment, the transmitting unit 25 transmits the capacity control parameters calculated by the parameter calculation unit 24 to the web system 2. However, the administrator of the web system 2 may set the capacity control parameters calculated by the parameter calculation unit 24 to the web system 2.

The tuning policy parameters include at least the following:
  The extraction conditions of the process identification information;
  Information indicating whether the capacity control parameters for each process identifier can be applied;
  The assumed amount of load; and
  The allowable limit of the internal retention time (the allowable limit "$Y_{limit}$" of the internal retention time)
The allowable limit of the internal retention time for each process identifier when different queue sizes can be set to the process identifiers (=the web system having the capacity control parameters for each process identifier).

The tuning policy parameters may directly or indirectly include the following information and may be incorporated as a customizable logic in the processing apparatus to simplify an input operation.

<Content of Designation Related to Input Destination of Operation Data>
  Of the operation data in readable location, means for selecting a Web server and processes to be processed
  Analysis target period in readable operation data (the upper limit and lower limit of the processing end time recorded in a log record)

<Parameters for Designating Extraction of Process Identification Information>
  An information extraction rule for giving a process identifier for each process in information for regression analysis from physical web server identification information or process identification information which is the acquisition source of the operation data (for example, a plurality of web servers are regarded as one type of web server in the web system to which a load distributor is applied)
  The extraction condition of the process identification information from the operation data (33a in FIG. 14) and a process identifier allocation rule (33b in FIG. 14)
  The reflection condition of a value, such as the length of downloaded data recorded in the log file of the operation data, in the process identifier (for example, a value obtained by rounding the logarithm of the length of the downloaded data to two significant figures is used as a portion of the process identification information)

<Content of Designation Related to Assumed Amount of Load>
  The value of L given to Approximate Expression (f(M, L)) of the internal retention time is directly designated.
  The maximum number of the number of internal retention requests (L) in the operation data is used.
  The average value of the number of internal retention requests (L) in the operation data is used.
  The number of internal retention requests (L) which reach the upper limit ($Y_{Limit}$) of the allowable internal retention time is used (for example, the number of internal retention requests ($L_i$) in which the average value of the internal retention times for the process identifier "i" is 10 seconds in the operation system before the set value of the capacity control parameter is changed).
  Job mix for each process identifier (the frequency of requests generated by each process identifier)

<Content of Indirect Designation of Weight for Improved Value of Each Process Identifier>
  A coefficient for calculating the capacity control parameters of the entire system using the weighted sum of the capacity control parameters for each process identifier or conditions for deriving the following coefficients
  Average corresponding to job mix for the operating period of acquired data
  The incidence ratio of each process identifier "i" is weighted.
  Average corresponding to the total running times of each process identifier "i" for the operating period of the acquired data
  The ratio of the total processing times of each process identifier "i" is weighted.
  Priority is given to the minimization of the latest response time
  In the number of internal retention requests "L", a weight for the latest process identifier "i" is 1 and a weight for the other process identifiers is 0.
  A weight for the process identifier "i" having the largest sum of the internal retention times in the operation data is 1 and a weight for the other process identifiers is 0.
  Minimization of the processing time with the maximum gradient
  A weight for the minimum value of the candidates "$M_i$" of the improved value of the set value of the maximum number of simultaneous executions for the process identifier "i" is 1 and a weight for the other process identifiers is 0.

Maximization of the number of internal retention requests

A weight for the minimum value of the candidates "$M_i$" of the improved value of the set value of the maximum number of simultaneous executions for the process identifier "i" is 1 and a weight for the other process identifiers is 0.

(In particular, this option is required even when there are multiple parameters for controlling the number of internal retention requests in the capacity control parameters for each URL group and the capacity control parameters for the entire process as in an example of uCosminexus (registered trademark))

Median

The median of the candidates "$M_i$" of the improved value of the set value of the maximum number of simultaneous executions is the improved value of the set value of the maximum number of simultaneous executions.

Minimization of the internal retention time of the process designated by the process identifier A weight for the candidates "$M_i$" of the improved value of the set value of the maximum number of simultaneous executions for the designated process identifier "i" is 1 and a weight for the other process identifiers is 0.

<Similarity Determination Conditions of Each Process Identifier>

A condition for determining whether the process identifiers "i" belonging to the same process "j" indicate "uniform processing"

For example, as a condition for determining whether the process identifier indicates "uniform processing" or whether the coefficients of the exponential parts of the preliminary approximate equations 34b have "substantially the same value", the following condition is used: when the difference between the values obtained by rounding the reciprocals of the coefficients "bi" of the exponential parts is less than 1, the processing is considered as uniform processing; or when the difference between the ratios of "bi" is less than 10%, the processing is considered as uniform processing.

The present invention can also be provided as a method for calculating the capacity control parameters of the information processing apparatus 1, a program, and a storage medium storing the program.

REFERENCE SIGNS LIST 1 information processing apparatus
2 Web system
2a, 2b Web server
3 terminal apparatus
4 network
11a to 11d queue
12a to 12d data processing unit
13 distributor
21 receiving unit
22 extraction unit
23 coefficient calculation unit
24 parameter calculation unit
25 transmitting unit
26 storage unit
41 arithmetic device
42 main storage device
43 auxiliary storage device
44 communication i/f
45 input device
46 display device
47 reading and writing device

The invention claimed is:

1. An information processing apparatus for reducing internal retention time of processing requests on a web system comprising:
   an extraction unit executed by a processor that extracts, from operation data of the web system having capacity control parameters including a maximum queue length indicating a maximum size of a queue which temporarily stores the processing requests and a maximum number of simultaneous executions indicating the maximum number of the processing requests that can be processed in parallel, an internal retention time required for the web system to process data for each of different numbers of internal retention requests wherein the number of internal retention requests is a sum of the queue length and the number of simultaneous executions, and wherein the internal retention time includes only processing time of the processing requests that is controlled by the capacity control parameters;
   a coefficient calculation unit executed by the processor that applies an approximate equation to the internal retention time for each of the different number of internal retention requests extracted by the extraction unit to calculate coefficients of the approximate equation by regression analysis, the approximate equation corresponding to a particular data processing structure of the web system;
   a parameter calculation unit executed by the processor that calculates new capacity control parameters including the maximum number of simultaneous executions and the maximum queue length, at which the internal retention time at different amounts of load of the web system is minimized, from the approximate equation having the coefficients calculated by the coefficient calculation unit; and
   a transmitting unit executed by the processor that transmits the new capacity control parameters calculated by the parameter calculation unit to the web system, wherein the web system executes the processing requests with the new capacity control parameters.

2. The information processing apparatus according to claim 1,
   wherein the data processing structure of the web system is classified into at least:
   a first data processing structure including one queue to which the processing requests for a content of uniform processing are input and one data processing unit which can process the maximum number of simultaneous executions in parallel and to which the processing requests for the content of uniform processing are input;
   a second data processing structure in which a plurality of sets, each having one queue to which the processing requests for the content of uniform processing are input and one data processing unit which can process the maximum number of simultaneous executions in parallel and to which the processing requests for the content of uniform processing are input, are provided so as to correspond to processes;
   a third data processing structure in which a plurality of sets, each having one queue to which the processing requests for the content of non-uniform processing are input and a plurality of data processing units which can process the maximum number of simultaneous executions in parallel and to which the processing requests for the content of uniform processing are input, are provided so as to correspond to processes; and
   a fourth data processing structure including one queue to which the processing requests for the content of non-uniform processing are input and one data processing unit which can process the maximum number of simultaneous executions in parallel and to which the processing requests for the content of non-uniform processing are input.

3. The information processing apparatus according to claim 2,
wherein the coefficient calculation unit calculates preliminary coefficients using the approximate equation when the number of internal retention requests is less than the maximum number of simultaneous executions and selects the approximate equation corresponding to the data processing structure of the web system on the basis of the calculated preliminary coefficients.

4. The information processing apparatus according to claim 3,
wherein the extraction unit divides the internal retention time into the internal retention time for each process and the internal retention time for each process identifier which is processed by the process and extracts the internal retention time,
the coefficient calculation unit substitutes the internal retention time for each process extracted by the extraction unit into the approximate equation and calculates the preliminary coefficients for each process, and
the coefficient calculation unit substitutes the internal retention time for each process identifier for identifying processing performed at a uniform speed, which is extracted by the extraction unit, into the approximate equation and calculates the preliminary coefficients for each process identifier.

5. The information processing apparatus according to claim 4,
wherein the coefficient calculation unit calculates the coefficients on the basis of the approximate equation corresponding to the first data processing structure when the preliminary coefficients for each process and the preliminary coefficients for each process identifier have the same value.

6. The information processing apparatus according to claim 4,
wherein the coefficient calculation unit calculates the coefficients on the basis of the approximate equation corresponding to the second data processing structure when the preliminary coefficients for each process and the preliminary coefficients for each process identifier do not have the same value and the preliminary coefficients for each process identifier have the same value in the same process.

7. The information processing apparatus according to claim 4,
wherein the coefficient calculation unit calculates the coefficients on the basis of the approximate equation corresponding to the third data processing structure when the preliminary coefficients for each process and the preliminary coefficients for each process identifier do not have the same value, the preliminary coefficients for each process identifier do not have the same value in the same process, and the capacity control parameters are given for each process and each process identifier.

8. The information processing apparatus according to claim 4,
wherein the coefficient calculation unit calculates the coefficients on the basis of the approximate equation corresponding to the fourth data processing structure when the preliminary coefficients for each process and the preliminary coefficients for each process identifier do not have the same value, the preliminary coefficients for each process identifier do not have the same value in the same process, and the capacity control parameters are given only for each process.

9. The information processing apparatus according to claim 1,
wherein the parameter calculation unit calculates the upper limit of the number of internal retention requests which does not exceed the internal retention time allowed in the web system from the approximate equation whose coefficients have been calculated, and
the parameter calculation unit calculates the maximum queue length from the maximum number of simultaneous executions and the upper limit of the number of internal retention requests.

10. A method for reducing internal retention time of processing requests on a web system, comprising:
an extraction step of extracting, from operation data of the web system having the capacity control parameters including a maximum queue length indicating a maximum size of a queue which temporarily stores the processing requests and a maximum number of simultaneous executions indicating the maximum number of the processing requests that can be processed in parallel, an internal retention time required for the web system to process data for each of different numbers of internal retention requests wherein the number of internal retention requests is a sum of the queue length and the number of simultaneous executions, and wherein the internal retention time includes only processing time of the processing requests that is controlled by the capacity control parameters;
a coefficient calculation step of applying an approximate equation to the internal retention time for each of the different number of internal retention requests extracted in the extraction step to calculate coefficients of the approximate equation by regression analysis, the approximate equation corresponding to a particular data processing structure of the web system;
a parameter calculation step of calculating new capacity control parameters including the maximum number of simultaneous executions and the maximum queue length, at which the internal retention time at different amounts of load of the web system is minimized, from the approximate equation having the coefficients calculated in the coefficient calculation step; and
a transmission step of transmitting the new capacity control parameters calculated by the parameter calculation step to the web system, wherein the web system executes the processing requests with the new capacity control parameters.

11. A computer program product stored on a non-transitory computer-readable medium for reducing internal retention time of processing requests on a web system, which when executed by a processor causes the processor to:
extract from operation data of the web system having capacity control parameters including a maximum queue length indicating a maximum size of a queue which temporarily stores the processing requests and a maximum number of simultaneous executions indicating the maximum number of the processing requests that can be processed in parallel, an internal retention time required for the web system to process data for each of different numbers of internal retention requests wherein the number of internal retention requests is a sum of the queue length and the number of simultaneous executions, and wherein the internal retention time includes only processing time of the processing requests that is controlled by the capacity control parameters;

apply an approximate equation to the internal retention time for each of the different number of internal retention requests extracted from the operation data to calculate coefficients of the approximate equation by regression analysis, the approximate equation corresponding to a particular data processing structure of the web system;

calculate new capacity control parameters including the maximum number of simultaneous executions and the maximum queue length, at which the internal retention time at different amounts of load of the web system is minimized, from the approximate equation having the calculated coefficients; and transmit the new capacity control parameters to the web system, wherein the web system executes the processing requests with the new capacity control parameters.

* * * * *